(12) United States Patent
Pohl

(10) Patent No.: US 9,486,799 B2
(45) Date of Patent: Nov. 8, 2016

(54) GLYCIDOL FUNCTIONALIZED ANION EXCHANGE STATIONARY PHASES

(75) Inventor: Christopher A. Pohl, Union City, CA (US)

(73) Assignee: DIONEX CORPORATION, Sunnyvale, CA (US)

( * ) Notice: Subject to any disclaimer, the term of this patent is extended or adjusted under 35 U.S.C. 154(b) by 1056 days.

(21) Appl. No.: 13/610,495

(22) Filed: Sep. 11, 2012

(65) Prior Publication Data

US 2014/0069870 A1    Mar. 13, 2014

(51) Int. Cl.
| | |
|---|---|
| *B01J 41/08* | (2006.01) |
| *B01J 20/32* | (2006.01) |
| *B01J 41/20* | (2006.01) |
| *B01D 15/36* | (2006.01) |
| *B01J 20/288* | (2006.01) |

(52) U.S. Cl.
CPC .............. *B01J 41/20* (2013.01); *B01D 15/363* (2013.01); *B01J 20/288* (2013.01); *B01J 20/3251* (2013.01); *B01J 20/3289* (2013.01); *B01J 41/085* (2013.01)

(58) Field of Classification Search
CPC .... B01J 41/20; B01J 20/3251; B01J 41/085; B01J 20/3289; B01J 20/288; B01D 15/363
See application file for complete search history.

(56) References Cited

U.S. PATENT DOCUMENTS

| | | | |
|---|---|---|---|
| 3,897,213 A | 7/1975 | Stevens et al. | |
| 3,920,397 A | 11/1975 | Small et al. | |
| 3,925,019 A | 12/1975 | Hamish et al. | |
| 3,926,559 A | 12/1975 | Stevens | |
| 4,101,460 A | 7/1978 | Small et al. | |

(Continued)

FOREIGN PATENT DOCUMENTS

| | | |
|---|---|---|
| CN | 101910835 A | 12/2010 |
| WO | 9418555 A1 | 8/1994 |
| WO | 0190199 A2 | 11/2001 |

OTHER PUBLICATIONS

Gong, Preparation of Weak Anion Exchange Chromatographic Packings Based on Monodisperse Polymer Beads and their Application in the Separation of Bioploymers, Sep. 13, 2005.*

(Continued)

*Primary Examiner* — Krishnan S Menon
*Assistant Examiner* — Waqaas Ali
(74) *Attorney, Agent, or Firm* — Jeffry S. Mann

(57) ABSTRACT

Treatment of anion exchange materials containing hydroxyl containing moieties in the beta position relative to the quaternary center in the hydroxide form with glycidol substantially alters the selectivity of the anion exchange material. Furthermore, sequential treatments of first a hydroxide containing solution to put the anion exchange material in the hydroxide form followed by treatment with glycidol in an alternating sequence progressively changes selectivity in a predictable manner allowing facile manipulation of selectivity. Unique to the selectivities achievable with this chemistry is the ability to reverse the elution order of sulfate and carbonate. With all other known systems, carbonate elutes ahead of sulfate and sometimes compromises the ability to quantitate sulfate. With glycidol treatment, carbonate can be moved after sulfate which eliminates interference issues for samples containing significantly more carbonate than sulfate. This modification is useful for columns operated with a hydroxide or carbonate eluent system.

17 Claims, 21 Drawing Sheets

(56) References Cited

U.S. PATENT DOCUMENTS

| | | | |
|---|---|---|---|
| 4,382,124 A | 5/1983 | Meitzner et al. | |
| 4,621,103 A * | 11/1986 | Kosuge | B01D 59/30 |
| | | | 521/28 |
| 4,882,226 A | 11/1989 | Schutyser et al. | |
| 4,999,098 A | 3/1991 | Pohl et al. | |
| 5,130,343 A | 7/1992 | Frechet et al. | |
| 5,135,650 A * | 8/1992 | Hjerten | B01J 20/262 |
| | | | 210/198.2 |
| 5,260,094 A | 11/1993 | Giannelis et al. | |
| 5,334,310 A | 8/1994 | Frechet et al. | |
| 5,352,360 A | 10/1994 | Stillian et al. | |
| 5,453,185 A | 9/1995 | Frechet et al. | |
| 5,728,457 A | 3/1998 | Frechet et al. | |
| 5,929,214 A | 7/1999 | Peters et al. | |
| 6,528,167 B2 | 3/2003 | O'Gara | |
| 6,533,964 B1 | 3/2003 | Hata et al. | |
| 6,537,468 B1 | 3/2003 | Hata et al. | |
| 6,844,372 B2 | 1/2005 | Goto et al. | |
| 6,887,384 B1 | 5/2005 | Frechet et al. | |
| 6,949,317 B2 | 9/2005 | Yoshida et al. | |
| 7,074,331 B2 | 7/2006 | Allington et al. | |
| 7,088,572 B2 | 8/2006 | Yoshida et al. | |
| 7,291,395 B2 | 11/2007 | Pohl et al. | |
| 7,303,671 B2 | 12/2007 | Srinivasan et al. | |
| 7,767,462 B2 | 8/2010 | Liu et al. | |
| 8,043,507 B2 | 10/2011 | Liu et al. | |
| 8,425,842 B2 | 4/2013 | Horiike | |
| 2003/0177915 A1 * | 9/2003 | Kaki | D21H 17/29 |
| | | | 99/485 |
| 2004/0059065 A1 | 3/2004 | Goto et al. | |
| 2005/0222279 A1 | 10/2005 | Larsson et al. | |
| 2006/0070937 A1 | 4/2006 | Rustamov et al. | |
| 2012/0125843 A1 | 5/2012 | Bouvier et al. | |

OTHER PUBLICATIONS

Sayin, Synthesis and oxoanions (dichromate/arsenate) sorption study of N-methylglucamine derivative of calix[4]arene immobilized onto poly[(phenyl glycidyl ether)-co-formaldehyde], Aug. 2010, vol. 67, Issue 3, pp. 385-391.*

Gong, Bolin et al., "Preparation of Weak Anion Exchange Chromatographic Packings Based on Monodisperse Polymer Beads and their Application in the Separatio of Biopolymers," J of Liquid Chromatography & Related Technologies, 29:235-245, 2006.

Berge et al., "Pharmaceutical Salts," J. of Pharm. Sci., 1977, 66(1), 1-19.

Berglund and Dasgupta, "Two-Dimensional Conductometric Detection in Ion Chromatography, Postsuppressor Conversion of Eluite Acids to a Base," Anal. Chem., 1991, 63, 2175-2183.

Ikada et al., "Reaction of Poly(vinyl Alcohol) with Potassium Persulfate and Graft Coppolymerization," J. of Polymer Sci., 1974, 12, 1829-1839.

* cited by examiner

US 9,486,799 B2

GLYCIDOL FUNCTIONALIZED ANION EXCHANGE STATIONARY PHASES

BACKGROUND OF THE INVENTION

Ion chromatography is a known technique for the analysis of ions which typically includes a chromatographic separation stage using an eluent containing an electrolyte, and an eluent suppression stage, followed by detection, typically by an electrical conductivity detector. In the chromatographic separation stage, ions of an injected sample are eluted through a separation column using an electrolyte as the eluent. In the suppression stage, electrical conductivity of the electrolyte is suppressed but not that of the separated ions so that the latter may be determined by a conductivity cell. This technique is described in detail in U.S. Pat. Nos. 3,897,213, 3,920,397, 3,925,019 and 3,926,559.

Among the many applications for ion chromatography, a significant application of ion chromatography is in analyzing water, e.g., surface water and well water. Worldwide, municipal facilities use ion chromatography to qualify water as being appropriate for human consumption. The ionic content of water varies significantly depending on the source, storage and handling conditions. In samples containing high levels of matrix ions such as chloride, sulfate and bicarbonate detecting trace amounts of ions such as bromate or chlorite or perchlorate is challenging.

Methods for ion analysis of water include direct injection and analysis, or pretreating the samples prior to a direct injection analysis. Direct injection is preferred, however, application of this method is limited for some samples with high matrix content due to the limited capacity of the stationary phases currently available. An alternate approach is to pursue pre-concentration of the ions in the sample in conjunction with heart cutting or some means of removing the matrix ions prior to analysis. Heart cutting methods are two-dimensional methods in which the matrix ions are separated or removed in the first dimension, enabling analysis of the ions of interest. Matrix ions are also removed using sample pretreatment with one or more pretreatment cartridges. For example a barium form cation exchange resin based cartridge is used to remove sulfate from the sample matrix. The methods discussed above are multi-step processes with multiple valve configurations, complex plumbing or are labor intensive. Therefore it is desirable to simplify the analysis protocol for samples containing matrix ions. Ion exchange phases having unique enhanced capacity architecture will facilitate analysis.

To counter some of the limitations of existing stationary phases a new phase and method of making this phase was recently introduced (U.S. Pat. No. 7,291,395). The method and phase rely on an amine epoxide-based chemistry to grow a hydrophilic hyperbranched structure on top of the substrate of the ion exchange phase. This type of structure does not have the limitation of inter-penetrating polymers of the prior art phases and shows excellent efficiencies. The capacity of these phases, however, could be enhanced to facilitate direct injection of samples with high matrix ion concentration.

Ion exchange phases should provide high resolution of species of interest, particularly over matrix ions, and the ability to handle high matrix ion concentrations without over-loading the stationary phase. These phases should also allow quantitation at trace levels of ions other than matrix ions and have unique selectivity to facilitate separation of species of interest. Furthermore, a desirable ion exchange material will be resistant to binding matrix ions, preventing these ions from interacting with the stationary phase and decreasing available capacity of this phase. The present invention provides such high capacity stationary phases and methods of making and using them.

BRIEF SUMMARY OF THE INVENTION

The present invention provides a new design for stationary phases for chromatography, for example, ion chromatography. Exemplary stationary phases of the invention are anion exchange materials, which exhibit the surprising property of eluting sulfate ahead of carbonate in ion chromatography. With all other known systems, carbonate elutes ahead of sulfate, which can compromise the ability to quantitate sulfate.

Exemplary anion exchange stationary phases of the invention include one or more moiety derived from a reaction between glycidol and one or more hydroxide moiety on the stationary phase. The unique architecture of this new stationary phase includes an ether moiety and a diol moiety derived from the reaction between glycidol and a hydroxy moiety. In exemplary embodiments, the hydroxy moiety is at a position beta or gamma to a quaternary amine moiety. In various embodiments, the quaternary amine is on the solid support of the anion exchange material and, conveniently, the stationary phases of the present invention can be rapidly and reproducible assembled on commercially available or other known anion exchange materials.

Glycidol is an epoxidized form of glycerol containing an epoxy functional group with an additional free hydroxyl group. The stationary phases of various embodiments of the invention are functionalized with one or more moiety derived from the reaction of glycidol, which has been found to substantially alter the selectivity of the anion exchange material upon which the stationary phase is based.

In an exemplary embodiment, the invention provides an anion exchange chromatographic medium comprising a solid support having covalently attached thereto an anion exchange moiety comprising a glycidol-derived ether having the formula:

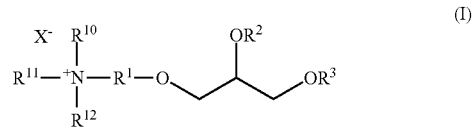

(I)

wherein $R^1$ is selected from substituted or unsubstituted alkyl and substituted or unsubstituted heteroalkyl. The symbols $R^2$ and $R^3$ represent groups that are independently selected from H, substituted or unsubstituted alkyl and substituted or unsubstituted heteroalkyl. The groups $R^{10}$, $R^{11}$ and $R^{12}$ are members independently selected from H, substituted or unsubstituted alkyl, substituted or unsubstituted heteroalkyl, substituted or unsubstituted aryl, substituted or unsubstituted heteroaryl and substituted or unsubstituted heterocylcoaryl. $X^-$ is an organic or inorganic anion. In an exemplary embodiment, one, two or all of $R^{10}$, $R^{11}$ and $R^{12}$ comprises a covalent bond to the solid support.

Also provided according to the present invention are methods for preparing the stationary phases of the invention by reaction between glycidol and one or more hydroxy moieties on a solid support. In some embodiments, the stationary phase is prepared by repeated reactions between glycidol and a hydroxy moiety on the growing stationary phase, leading to successive generations of glycidol-derived ether and diol moieties, which are anchored to the solid support.

Also provided by the invention are chromatographic devices, e.g., columns, containing the anion exchange medium of the invention, and methods of using the medium and such devices to perform chromatographic separations. In various embodiments, the separation is ion chromatography.

In an exemplary embodiment, the invention provides a chromatographic system, which includes a separation device containing a stationary phase of the invention. The system optionally includes further components of use in performing a chromatographic separation, e.g., an ion chromatography separation.

Other objects, advantages and aspects of the invention are provided in the detailed description below.

DETAILED DESCRIPTION OF THE INVENTION

I. Introduction

Figure 1:
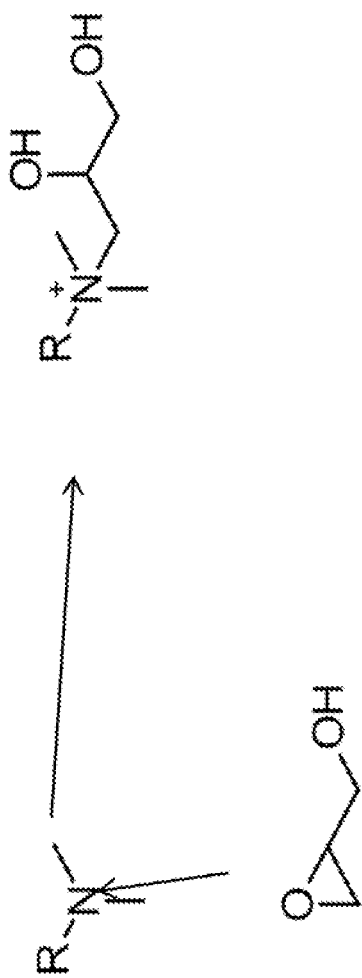
FIG. 1. shows an exemplary reaction of glycidol with tertiary amines.

The current invention provides stationary phases with unique chromatographic properties, which are useful as stationary phases for a variety of chromatographic applications, such as ion chromatography and solid-phase extraction (SPE). In certain embodiments, the stationary phases of the invention have characteristic anion-exchange capabilities, cation-exchange capabilities or both within the same chromatographic material.

II. Definitions

Where substituent groups are specified by their conventional chemical formulae, written from left to right, they equally encompass the chemically identical substituents, which would result from writing the structure from right to left, e.g., —CH$_2$O— is intended to also recite —OCH$_2$—.

The term "alkyl," by itself or as part of another substituent, means, unless otherwise stated, a straight or branched chain, or cyclic hydrocarbon radical, or combination thereof, which may be fully saturated, mono- or polyunsaturated and can include di- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl (e.g., —$CH_2$—$CH_2$—CHI, —$CH_2$—$CH_2$—$CH_2$—), isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to include those derivatives of alkyl defined in more detail below, such as "heteroalkyl." Alkyl groups that are limited to hydrocarbon groups are termed "homoalkyl". The term "alkyl" can also mean "alkylene" or "alkyldiyl" as well as alkylidene in those cases where the alkyl group is a divalent radical.

The term "alkylene" or "alkyldiyl" by itself or as part of another substituent means a divalent radical derived from an alkyl group, as exemplified, but not limited, by —$CH_2$—$CH_2CH_2$— (propylene or propane-1,3-diyl), and further includes those groups described below as "heteroalkylene." Typically, an alkyl (or alkylene) group will have from 1 to about 30 carbon atoms, preferably from 1 to about 25 carbon atoms, more preferably from 1 to about 20 carbon atoms, even more preferably from 1 to about 15 carbon atoms and most preferably from 1 to about 10 carbon atoms. A "lower alkyl", "lower alkylene" or "lower alkyldiyl" is a shorter chain alkyl, alkylene or alkyldiyl group, generally having about 10 or fewer carbon atoms, about 8 or fewer carbon atoms, about 6 or fewer carbon atoms or about 4 or fewer carbon atoms.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si, S and B, and wherein the nitrogen and sulfur atoms may optionally be oxidized and the nitrogen heteroatom may optionally be quaternized. The heteroatom(s) O, N, B, S and Si may be placed at any interior position of the heteroalkyl group or at the position at which the alkyl group is attached to the remainder of the molecule. Examples include, but are not limited to, —$CH_2$—$CH_2$—O—$CH_3$, —$CH_2$—$CH_2$—NH—$CH_3$, —$CH_2$—$CH_2$—N($CH_3$)—$CH_3$, —$CH_2$—S—$CH_2$—$CH_3$, —$CH_2$—$CH_2$, —S(O)—$CH_3$, —$CH_2$—$CH_2$—S(O)$_2$—$CH_3$, —CH=CH—O—$CH_3$, —Si($CH_3$)$_3$, —$CH_2$—CH=N—$OCH_3$, and —CH=CH—N($CH_3$)—$CH_3$. Up to two heteroatoms may be consecutive, such as, for example, —$CH_2$—NH—$OCH_3$ and —$CH_2$—O—Si($CH_3$). Similarly, the term "heteroalkylene" by itself or as part of another substituent means a divalent radical derived from heteroalkyl, as exemplified, but not limited by, —$CH_2$—$CH_2$—S—$CH_2$—$CH_2$— and —$CH_2$—S—$CH_2$—$CH_2$—NH—$CH_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —$CO_2R'$— represents both —C(O)OR' and —OC(O)R'.

The terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like. The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo($C_1$-$C_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl groups (or rings) that contain from one to four heteroatoms selected from N, O, S, Si and B, wherein the nitrogen and sulfur atoms are optionally oxidized, and the nitrogen atom(s) are optionally quaternized. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, the term "aryl" when used in combination with other terms (e.g., aryloxy, arylthioxy, arylalkyl) includes both aryl and heteroaryl rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g. a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl" and "heteroaryl") are meant to include both substituted and unsubstituted forms of the indicated radical. Preferred substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R"', —OC(O)R', —C(O)R', —CO$_2$R', —CONR'R", —OC(O)NR'R", —NR"C(O)R', —NR'—C(O)NR"R"', —NR"C(O)$_2$R', —NR—C(NR'R" R"')|NR"", —NR—C(NR'R")=NR"', —S(O)R', —S(O)$_2$R', —OS(O)$_2$R', —S(O)$_2$NR'R", —NRSO$_2$R', —CN and —NO$_2$ in a number ranging from zero to (2 m'+1), where m' is the total number of carbon atoms in such radical. R', R", R"' and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R"' and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF, and —CH$_2$CF$_3$) and acyl (e.g., —C(O)CH$_3$, —C(O)CF$_3$, —C(O)CH$_2$OCH$_3$, and the like).

Similar to the substituents described for the alkyl radical, substituents for the aryl and heteroaryl groups are generically referred to as "aryl group substituents." The substituents are selected from, for example: substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R"', —OC(O)R', —C(O)R', —CO$_2$R', —CONR'R", —OC(O)NR'R", —NR"C(O)R', —NR'—C(O)NR"R"', —NR"C(O)$_2$R', —NR—, C(NR'R"R"')=NR"", —NR—C(NR'R")=NR"', —S(O)R', —S(O)$_2$R', —S(O)$_2$NR'R", —NRSO$_2$R', —CN and —NO$_2$, —R', —N$_3$, —CH(Ph)$_2$, fluoro(C$_1$-C$_4$)alkoxy, and fluoro (C$_1$-C$_4$)alkyl, in a number ranging from zero to the total number of open valences on the aromatic ring system; and where R', R", R"' and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R"' and R"" groups when more than one of these groups is present.

Two of the substituents on adjacent atoms of the aryl or heteroaryl ring may optionally be replaced with a substituent of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl or heteroaryl ring may optionally be replaced with a substituent of the formula —(CRR'),—X—(CR"R"')$_d$—, where s and d are independently integers of from 0 to 3, and X is —O—, —NR'—, —S—, —S(O)—, —S(O)$_2$—, or —S(O)$_2$NR'—. The substituents R, R', R" and R"' are preferably independently selected from hydrogen or substituted or unsubstituted (C$_1$-C$_6$)alkyl.

As used herein, the term "fused ring system" means at least two rings, wherein each ring has at least 2 atoms in common with another ring. "Fused ring systems may include aromatic as well as non aromatic rings. Examples of "fused ring systems" are naphthalenes, indoles, quinolines, chromenes and the like.

As used herein, the term "heteroatom" includes oxygen (O), nitrogen (N), sulfur (S), silicon (Si) and boron (B).

The symbol "R" is a general abbreviation that represents a substituent group that is selected from substituted or unsubstituted alkyl, substituted or unsubstituted heteroalkyl, substituted or unsubstituted aryl, substituted or unsubstituted heteroaryl, and substituted or unsubstituted heterocycloalkyl groups.

The terms "substrate" and "support" or "solid support" are used interchangeably.

When compounds of the present invention contain relatively basic or acidic functionalities, salts of such compounds are included in the scope of the invention. Salts can be obtained by contacting the neutral form of such compounds with a sufficient amount of the desired acid or base, either neat or in a suitable inert solvent. Examples of salts for relative acidic compounds of the invention include sodium, potassium, calcium, ammonium, organic amino, or magnesium salts, or a similar salts. When compounds of the present invention contain relatively basic functionalities, acid addition salts can be obtained by contacting the neutral form of such compounds with a sufficient amount of the desired acid, either neat or in a suitable inert solvent. Examples of acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids and the like, as well as the salts derived from organic acids like acetic, propionic, isobutyric, maleic, malonic, benzoic, succinic, suberic, fumaric, lactic, mandelic, phthalic, benzenesulfonic, p-tolylsulfonic, citric, tartaric, methanesulfonic, and the like. Also included are salts of amino acids such as arginate and the like, and salts of organic acids like glucuronic or galactunoric acids and the like (see, for example, Berge et al., *Journal of Pharmaceutical Science* 1977, 66: 1-19). Certain specific compounds of the present invention contain both basic and acidic functionalities that allow the compounds to be converted into either base or acid addition salts.

The neutral forms of the compounds are preferably regenerated by contacting the salt with a base or acid and isolating the parent compound in the conventional manner. The parent form of the compound differs from the various salt forms in certain physical properties, such as solubility in polar solvents, but otherwise the salts are equivalent to the parent form of the compound for the purposes of the present invention.

The terms "average diameter of the particle", "particle size", "average particle size", "median particle size", or any grammatical variation thereof refers to the particle size specification for a substrate (solid-support) of the invention.

Particle-sizes are typically provided by the manufacturer. Particle sizes can refer to any type of particle including spherical and irregular-shaped particles.

As used herein, "glycidol" is a generic term referring to a molecule that includes an epoxide moiety and a hydroxyl moiety. In specific instances, glycidol refers to 2-(hydroxymethyl)oxirane.

As used herein, and "anion exchange chromatographic medium" is a type of "stationary phase" of the invention.

III. Stationary Phases

The stationary phases of the invention include a first layer derived from the reaction of glycidol with a hydroxyl moiety on the substrate in contact with and at least partially coating the substrate of the stationary phase. The hydroxyl is on the solid support of the stationary phase or it is on one or more layer derived from the reaction between glycidol and a hydroxide. An amine moiety on the solid support serves to anchor the first layer of reaction product from the glycidol-hydroxyl reaction. The solid support serves as a foundation for the attachment, and in various embodiments, the growth and attachment, of a branched structure derived from sequential reaction of glycidol with a hydroxyl on the surface resulting from the previous reaction between glycidol and a hydroxy moiety. Multiple components (and iterations of reactions of these components) are of use in forming the first polymer layer and the hyperbranched structure, thereby providing a stationary phase that can be engineered to have a desired property such as ion capacity, ion selectivity, and the like.

In an exemplary embodiment, the invention provides an anion exchange chromatographic medium comprising a solid support having attached thereto an anion exchange moiety comprising a glycidol-derived ether having the formula:

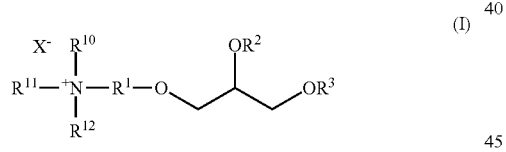

wherein $R^1$ is selected from substituted or unsubstituted alkyl and substituted or unsubstituted heteroalkyl. The symbols $R^2$ and $R^3$ represent groups that are independently selected from H, substituted or unsubstituted alkyl and substituted or unsubstituted heteroalkyl. The groups $R^{10}$, $R^{11}$ and $R^{12}$ are members independently selected from H, substituted or unsubstituted alkyl, substituted or unsubstituted heteroalkyl, substituted or unsubstituted aryl, substituted or unsubstituted heteroaryl and substituted or unsubstituted heterocylcoaryl. X' is an organic or inorganic anion. In an exemplary embodiment, the stationary phase according to Formula I is formed by reaction an amine-functionalized solid support with glycidol ("Reaction 1").

The moiety according to Formula I is attached to the solid support by any convenient means. In an exemplary embodiment, the moiety according to Formula I is attached to the solid support by an ionic or covalent bond. In various embodiments one, two or all of $R^{10}$, $R^{11}$ and $R^{12}$ comprises a covalent bond to the solid support. Where Formula I is attached to the solid support by an ionic bond, X' can represent the solid support.

In an exemplary embodiment, the stationary phase is formed by reaction of an amine-functionalized solid support with glycidol. The amine is a primary, secondary or tertiary amine. Glycidol will react with the amine, e.g., the tertiary amines to produce quaternary amines with a hydroxyl group in the beta and gamma position relative to the nitrogen. The hydroxyl groups from glycidol improve the hydrophilicity of the ion exchange site and increase the elution power of hydroxide. See, FIG. 1.

In various embodiments, the stationary phase of the invention is prepared by sequential treatment of the solid support and the growing stationary phase with glycidol in an alternating sequence (e.g., OH⁻ then glycidol). The buildup of successive layers of glycidol-derived moieties on the stationary phase progressively changes the ion selectivity of the stationary phase. In an exemplary embodiment, the change in ion selectivity occurs in a predictable manner allowing facile manipulation of the ion selectivity of the stationary phase. Unique to the selectivity achievable with this chemistry is the ability to reverse the elution order of sulfate and carbonate. With all other known systems, carbonate elutes ahead of sulfate and can compromise the ability to quantitate sulfate. With glycidol-based stationary phases, carbonate can be eluted after sulfate which eliminates interference issues for samples containing significantly more carbonate than sulfate. This modification is useful for columns operated with a hydroxide eluent system as well as columns operated with a carbonate eluent system.

Thus, in an exemplary embodiment, the invention provides an anion exchange material according to Formula I in which wherein $R^2$ and $R^3$ are independently selected from H and

wherein $R^4$ and $R^5$ are independently selected from H, substituted or unsubstituted alkyl and substituted or unsubstituted heteroalkyl. This stationary phase can be produced by submitting the stationary phase according to Formula I to a reaction (Reaction 2) with glycidol.

In a further exemplary embodiment, the anion exchange material is an anion exchange material of Formula II, in which $R^4$ and $R^5$ are independently selected from H and:

$R^6$ and $R^7$ are independently selected from H, substituted or unsubstituted alkyl and substituted or unsubstituted heteroalkyl. This stationary phase can be produced by submitting the stationary phase according to Formula II to a reaction cycle with glycidol (Reaction 3).

In various embodiments, the invention provides an anion exchange material in which $R^6$ and $R^7$ according to Formula III are independently selected from H and:

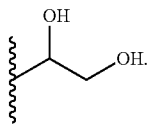

(IV)

This stationary phase can be produced by submitting the stationary phase according to Formula III to a reaction with glycidol (Reaction 4).

As will be appreciated by those of skill in the art, the iterative process of adding successive generations of moieties derived from the reaction of glycidol and a hydroxide moiety to a hydroxyl of an earlier generation is not limited by the examples set forth hereinabove. Thus, the anion exchange media of the invention can include 1, 2, 3, 4, 5, 6, 7, 8, 9, 10 . . . n generations of glycidol-derived moieties formed by the reaction of glycidol with a hydroxide from a previous generation reaction between glycidol and a hydroxide. In various embodiments, n is more than about 15, more than about 20 or more than about 25.

In various embodiments, the anion exchange stationary phase of the invention has a formula as set forth above in which at least one of $R^{10}$, $R^{11}$ and $R^{12}$ includes a moiety derived from N-methyl glucamine. In an exemplary embodiment, the stationary phase comprises the moiety of Formula V:

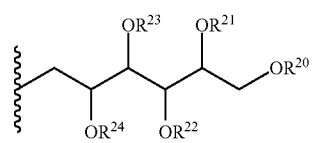

(V)

in which $R^{20}$, $R^{21}$, $R^{22}$, $R^{23}$ and $R^{24}$ are independently selected from H and a glycidol-derived ether, with the proviso that at least one of $R^{20}$, $R^{21}$, $R^{22}$, $R^{23}$ and $R^{24}$ is said glycidol-derived ether.

In an exemplary embodiment, the moiety according to Formula V has the formula:

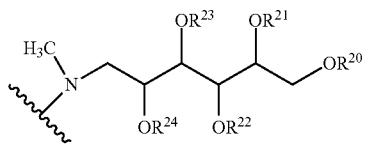

(VI)

in which the nitrogen of the amine moiety is optionally quaternized.

In various embodiments, the moieties of Formula V and VI include a linker formed by the reaction of a diepoxide and a secondary or tertiary amine. In an exemplary embodiment, the secondary or tertiary moiety is the amine moiety of the moieties for Formula V and/or VI.

In the embodiments set forth herein, the moiety:

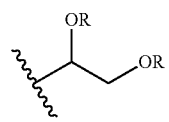

(VII)

in which the "R" groups correspond to $R^4$, $R^5$, $R^6$, $R^7$, $R^{20}$, $R^{21}$, $R^{22}$, $R^{23}$ and $R^{24}$ and may each be H optionally corresponds to Formula VII:

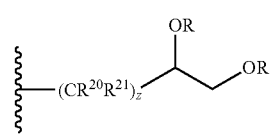

(VIII)

in which $R^{20}$ and $R^{21}$ are independently selected from H, substituted or unsubstituted alkyl and substituted or unsubstituted heteroalkyl, and z is 1, 2, 3, 4, 5, 6, 7, 8, 9, 10 or greater. When z is greater than one, each $CR^{20}R^{21}$ is independently selected.

In an exemplary embodiment, $(CR^{20}R^{21})$, is methyl and the moiety according to Formula VI has the formula:

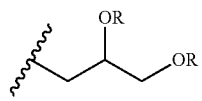

(IX)

Solid Support

The substrate or solid support of the anion exchange stationary phase of the invention can be any material (e.g., particles) useful as a stationary phase/packing material for chromatography including porous and non-porous solids.

Exemplary substrates include cross-linked and non-cross-linked polymers. Other substrates include silica-based (e.g., silicon oxide), titanium-based (e.g., titanium oxide), germanium-based (e.g., germanium oxide), zirconium-based (e.g., zirconium oxide) and aluminum-based (e.g., aluminum oxide), carbonized materials and metals.

The solid support may be formed from any synthetic resin material. Exemplary synthetic polymer ion-exchange resins include poly(phenol-formaldehyde), poly(acrylic acid), poly (methacrylic acid), polynitriles, amine-epichlorohydrin copolymers, graft polymers of styrene on polyethylene or polypropylene, poly (2-chloromethyl-1,3-butadiene), poly (vinylaromatic) resins such as those derived from styrene, α-methylstyrene, chlorostyrene, chloromethylstyrene, vinyltoluene, vinylnaphthalene or vinylpyridine, corresponding esters of acrylic acid and methacrylic acid, and similar unsaturated monomers, mono-vinylidene monomers including the monovinylidine ring-containing nitrogen heterocyclic compounds, and any copolymers of the above resins. Additional examples include glycidyl acrylate-based and glycidyl methacrylate-based materials (e.g., 2-glycidyloxyethyl methacrylate, vinylbenzyl glycidyl ether, 2-(4-vinylbenzyloxy)ethyl glycidyl ether) as well as those derived from vinylbenzyl chlorides, vinylbenzyl alcohols, 2-(4-vinylbenzyloxy)ethanol, polyacrylamides, polyvinylalcohols, and polyvinylformamides.

Any of the above materials can optionally be co-polymerized with monomers incorporating ionic or ionizable (and optionally reverse-phase) functionalities. Any of the above materials can optionally be functionalized with a suitable ligand incorporating ionic or ionizable and optionally reverse-phase functionalities.

In one embodiment, the support comprises cross-linked polymers or copolymers. An exemplary copolymer is styrene-divinylbenzene copolymer (e.g., PS-DVB). In one example, the styrene-divinylbenzene copolymer contains between about 0% to about (10% divinylbenzene monomer by weight. In another example, the styrene-divinylbenzene copolymer contains between about 25% to about 80% divinylbenzene monomer by weight. The copolymer can be prepared, for example, according to the method of Ikada et al., *Journal of Polymer Science*, Vol. 12, 1829-1839 (1974) or as described in U.S. Pat. No. 4,382,124 to Meitzner, et al.

In one example, the solid support includes a silica, alumina, zirconia, or titania-polymeric resin hybrid material. Exemplary silica-organic hybrids are described in U.S. Pat. No. 6,528,167 and U.S. Patent Application Publication 2006/0070937 (application Ser. No. 11/240,695), the disclosures of which are incorporated herein by reference for all purposes.

In one example, a solid support of use in the present invention is formed by well known suspension polymerization techniques. In this example, the particles are typically derived from a monomer mixture, which is insoluble in the solvents with which they will be contacted. Exemplary substrates are formed by heating and stirring a suspension of monomers in a suitable solvent in the presence of a suitable emulsifying agent. Alternatively, the polymerization may be carried out by a suspension, bulk or solution process followed by grinding the resin to a desired size by mechanical means (e.g., ball mills, rod mills or the like).

The solid support can be of any form, including particulates (e.g., spherical, essentially spherical: e.g., resin beads), chips, chunks, blocks, monoliths and the like. When the substrate is in particulate form, the particles (e.g., irregular-shaped or bead-shaped, e.g., essentially spherical) have a median particle size (i.e., diameter). In one example, the median particle size of the substrate (e.g., spherical silica gel) is between about 0.1 (e.g., silica micro-spheres) and about 10,000 μm (microns). In one example, the median particle size of the substrate is between about 1 and about 5000 microns, between about 1 and about 1000 microns, between about 1 and about 500 microns, between about 1 and about 400 microns, between about 1 and about 300 microns, between about 1 and about 200 microns or between about 1 and about 100 microns. In yet another example, the median particle size of the substrate is between about 1 and about 80 microns, between about 1 and about 70 microns, between about 1 and about 60 microns, between about 1 and about 50 microns, between about 1 and about 40 microns, between about 1 and about 30 microns, between about 1 and about 20 microns or between about 1 and about 10 microns. In other example, the median particle size of the substrate particles is between about 10 and about (X) microns, between about 10 and about 80 microns, between about 40 and about 200 microns, between about 40 and about 100 microns, between about 40 and about 80 microns, between about 60 and about 200 microns, between about 60 and about 100 microns, between about 70 and about 200 microns, between about 80 and about 200 microns, between about 100 and about 200 microns, between about 200 and about 600 microns, between about 200 and about 500 microns or between about 200 and about 400 microns.

Generally, substrate particles useful in any packed bed chromatographic application (e.g., LC, HPLC or ultra-pressure chromatography) are suitable for use in the stationary phases of the invention.

In various examples, the support is in particulate form, and multiple support particles are disposed in a packed bed. For example, a plastic or metal column is packed with the support particles.

In other examples, the solid support particles are essentially "monodisperse" or essentially "homodisperse", which indicates that the particle size of the majority of the particles (e.g., 80, 90 or 95% of the particles) does not vary substantially (e.g., not more than 50%) below or above the median particle size (M). In an exemplary monodisperse substrate particle population, 90% of the particles have an average particle size of between about 0.5 times M and about 1.5 times M.

In another example, the substrate is an inorganic or organic monolith. In one example the solid support includes a silica monolith. In another example, the solid support includes an alumina monolith. In yet another example, the solid support includes a zirconia monolith. In a further example, the solid support includes a titania monolith. Exemplary monolithic materials based on organic compositions and methods of preparing such materials are described in U.S. Pat. Nos. 5,130,343; 5,929,214; 5,728,457; 5,260,094; 6,887,384; 5,334,310; 7,303,671; 5,453,185 and 7,074,331.

An exemplary solid support of use in the present invention is assembled by repeated condensation polymerization of a diepoxide and one or more bifunctional moiety. For example, one solid support of use is formed by the steps of (a) reacting at least a first amine compound comprising amino groups selected from the group consisting of ammonia, a primary and a secondary amine, with at least a first polyfunctional compound, having at least two functional moieties reactive with said amino groups, in the presence of a substrate to form a first condensation polymer reaction product ("CPRP"), with an excess of either at least said first amine compound or first polyfunctional compound, irreversibly attached to said substrate, the first CPRP including first amine functional moieties, and (b) reacting at least a second amine compound, comprising amino groups selected from the group consisting of ammonia, a primary and a secondary amine, or at least a second polyfunctional compound with the excess first amine compound or first polyfunctional compound in the first condensation polymer reaction product to form a second CPRP. Solid supports according to this format and methods of making such solid supports are described in U.S. Pat. No. 7,291,395.

In another exemplary embodiment the invention provides an aggregated chromatographic material incorporating the stationary phase set forth herein. Thus, the stationary phase of the invention is contacted with a second ion exchange medium having an opposite charge under conditions promoting the electrostatic aggregation of the two ion exchange materials, thereby forming an electrostatically aggregated ion exchange medium. In various embodiments, the stationary phase of the invention is negatively charged and the second ion exchange medium is positively charged. In another exemplary embodiment, the ion exchange stationary phase of the invention is positively charged and the second ion exchange stationary phase is negatively charged. Such aggregated media are described in, for example, Small, et al.

U.S. Pat. No. 4,101,460 in which is described finely divided insoluble materials are bound by electrostatic attraction to substrate particles having ion exchange sites.

The invention also provides devices and systems incorporating the anion exchange stationary phases of the invention. Thus, in an exemplary embodiment, the anion exchange chromatographic medium is in a flow-through bed suitable for use as a chromatographic device. In an exemplary embodiment, the invention provides a chromatography column packed with the anion exchange chromatographic medium of the invention.

The column hardware in one embodiment of the invention includes rigid tubes to be used as chromatographic columns, with various shapes including cylindrical, conical, rectangular, and polygonal or an assembly of these tubes. The tube may be made from any conventional materials know in the art including metal, glass, silica, plastic or other polymers, more preferably the stainless steel or glass. The inner dimension of this tube can be from micrometers to meters in diameter, thickness, width, or depth. The stationary phase may span the entire cross-section area of the tube where the separation of the samples take place by passing through the tube axially or radially (Lee, W-C, et al, "Radial Flow Affinity Chromatography for Trypsin Purification", Protein Purification (book), ACS Symposium Series 427, Chapter 8, American Chemical Society, Washington, D.C., 1990.) depending on the mode of separation, more specifically the axial or direct flow chromatography or the radial flow chromatography. The inner surface of the column may be non-reactive or may be treated to increase adhesion to the surface of stationary phase. The tube can incorporate any usable fittings know in the art to connect it with other instruments, more specifically chromatography instruments.

IV. Systems

In various embodiments, the invention provides a chromatographic system. In an exemplary embodiment, the system is an ion chromatography system. Exemplary systems include one or more separation device, which contains a stationary phase of the invention. An exemplary system includes one or more separation device in line and in fluidic communication with one or more device for regulating eluent supply to the separation device, e.g., an eluent generator, a pump; one or more detection device, e.g., a conductivity detector; one or more means of introducing a sample on to the separation device, e.g., a sample injection valve; and one or more means to suppress matrix ions, which will otherwise interfere with the analysis, e.g., a suppressor.

By way of illustration, exemplary systems for ion chromatography analysis typically include a chromatographic separation zone using an eluent containing an electrolyte, and an eluent suppression stage, followed by detection, typically performed by a conductivity detector. In the chromatographic separation stage, ions of an injected sample are eluted from a separation column. In the suppression stage, electrical conductivity of the eluent electrolyte is suppressed but not that of the separated ions.

Any convenient means of suppressing ions is of use in the system of the invention. An exemplary means of suppressing electrolyte uses an ion exchange resin bed. In an improved form of suppression, a charged membrane in the form of a fiber or sheet is used in place of the resin bed. In sheet form, the sample and eluent are passed on one side of the sheet with a flowing regenerant on the other side of the sheet. The sheet comprises an ion exchange membrane partitioning the regenerant from the effluent of chromatographic separation. The membrane passes ions of the same charge as the exchangeable ions of the membrane to convert the electrolyte of the eluent to weakly ionized form, followed by detection of the ions. One effective form of suppressor is described in U.S. Pat. No. 4,999,098. U.S. Pat. No. 5,352,360 describes a suppressor in which effluent from the detector is recycled through regenerant flow channels.

Any detection means can be used in the systems of the invention. In an exemplary embodiment, at least one detector is a conductivity detector. In an exemplary embodiment, the system includes an ion conversion zone and more than one detector. In Berglund, I., et al. *Anal. Chem.* 63: 2175 (1991), a multiple detector system is described. Here, conventional ion chromatography (IC) is performed using a first conductivity detector. The effluent from that detector is passed sequentially through cation exchange and anion exchange conversion zones. For anion analysis, the effluent from the first detector is in the usual IC form of HX (wherein X is the analyte anion) as it exits from the suppressor. Two different types of convertors are disclosed. In a sequential packed column form, the effluent first passes cation (sodium) exchange resin and then anion (hydroxide) exchange resin, resulting in sequential conversion first to NaX salt and thereafter to NaOH. A permselective membrane-type convertor is also disclosed for such sequential conversion. After conversion, the ion conductivity of the sodium hydroxide is measured in the second detector and compared to the ion conductivity of the first detector.

In PCT Publication WO 9418555, apparatus and methods are disclosed using IC principles in which different detectors provide useful comparative signals. Specifically, in one form of the apparatus, separating means, typically in the form of a chromatographic resin column, separates the analyte ions in the presence of an eluent comprising electrolyte. In one embodiment, the analyte ions in acid or base form are converted to their corresponding salts in a single conversion with salt-forming ions of opposite charge. For example, for analyte anions represented by "X", and using $Na^+$ ion, NaX is measured in the second detector means. This is referred to herein as the "single conversion mode." It discloses a salt convertor which minimizes dispersion which could skew peak ratios of the single conversion type. An exemplary single conversion convertor is an on-line microelectrodialytic ion source which supplies the salt-forming ion through a membrane. It includes a salt-forming ion source channel, a suppressor effluent flow channel and a permselective ion exchange membrane partitioning the two channels. The membrane includes exchangeable ions of the same charge as the salt-forming ions and is resistant to transmembrane passage of the ionic species. An electrical potential is applied between the ion source channel and suppressor effluent flow channel. The latter channel is in fluid communication with the effluent from the suppressor. Other exemplary single conversion convertors include the use of an ion exchange membrane barrier without electrolysis, but with external acid or base concentrations sufficient to overcome the Donnan barrier. Still other systems include the use of a porous membrane barrier using the application of current or differential pressure to drive the acid or base salt-forming ions into the suppressor effluent flow channel. Single conversion is also disclosed by flowing the suppressor effluent stream through an ion exchange medium such as a column of an ion exchange resin bed having exchangeable ions of opposite charge to the analyte ions.

Eluent is supplied from a source, which can includes a vessel containing premade eluent or it can be generated by an eluent generator such as that disclosed in U.S. Pat. No. 7,767,462.

The system optionally further includes a means to remove gas generated during a run cycle of the system. See, e.g., U.S. Pat. No. 8,043,507.

V. Methods

Method of Manufacture

The present invention provides methods having numerous advantages over known methods of performing ion chromatography. For example the methods of producing the stationary phases produce stationary phases which are easily assembled and are stable. The stationary phases can be readily formed on a wide variety of substrates. Moreover, the hydrophilic nature of the stationary phases are ideally suited for the separation of ions, providing excellent resolution of bromate from chloride as well as excellent resolution of both bromide and chlorate from nitrate. Moreover, the methods of the invention produce and utilize a stationary phase in which sulfate elutes before carbonate.

In an exemplary embodiment, the invention provides a method of preparing the stationary phase (e.g., anion exchange chromatographic medium) of the invention. The method includes: (a) reacting with a first amount of glycidol a hydroxyl moiety at a position selected from β to a quaternary amine and γ to a quaternary amine with glycidol under conditions appropriate to convert said hydroxyl moiety to said glycidol-derived ether according to Formula I.

In various embodiments, the method further includes: (b) reacting with a second amount of glycidol said glycidol-derived ether according to Formula I under conditions appropriate to form a second glycidol-derived ether according to Formula II.

In various embodiments, the method further includes: (c) reacting with a third amount of glycidol said glycidol-derived ether according to Formula II under conditions appropriate to form a third glycidol-derived ether according to Formula III.

In various embodiments, the method further includes: (d) reacting with a fourth amount of glycidol said glycidol-derived ether according to Formula III under conditions appropriate to form a fourth glycidol-derived ether according to Formula IV.

As discussed above, the stationary phase of the invention can incorporate any number of generations of reaction products between glycidol and a hydroxyl moiety on the previous generation. In an exemplary embodiment, the method further includes: (e) repeating step (d) n times, thereby preparing an anion exchange medium according to Formula (IV), wherein n is an integer selected from 0, 1, 2, 3, 4, 5, 6, 7, 8, 9 and 10.

In an exemplary method, prior to step (a), the solid support is treated with a base, converting the solid support to its basic form. The base can be a component of a solution. In an exemplary embodiment, the solution is an aqueous solution and the base is an aqueous base, e.g., $OH^-$.

Figure 4:
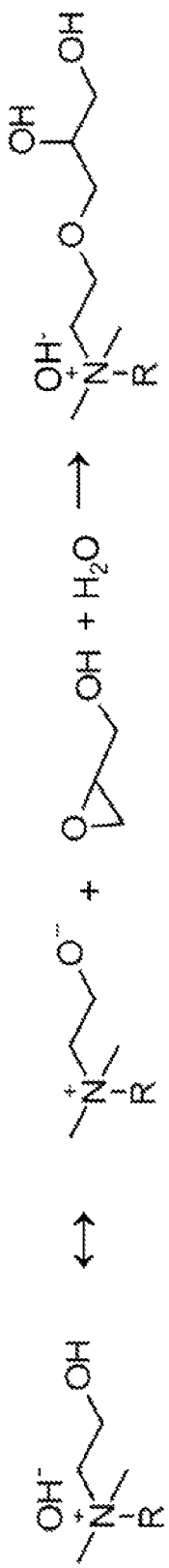
FIG. 4 shows a representative example of the glycidol functionalization of a hydroxyl moiety beta to a quaternary amine site.

An exemplary reaction scheme producing a stationary phase of the invention is set forth in FIG. 4. As shown in this figure, glycidol reacts preferentially with (1-hydroxyl groups due to their relatively acidic character. The reaction with the J-hydroxyl group reduces hydroxide selectivity since this selectivity is dependent upon ionization of the β-hydroxyl group. Reduction of hydroxide selectivity is partially mitigated by the addition of two additional hydroxyl groups. Glycidol also reacts with slower reaction kinetics with hydroxyl groups in the proximity of a quaternary ion exchange site. Although epoxides react more readily with amines in the free base form, they also react readily with alcohols, especially if they are ionized. The quaternary center of an ion exchange site has an electron withdrawing character that increases the acidity of alcohols, particularly those alcohols that are in the beta position relative to the quaternary center. FIG. 4 shows a hypothetical reaction with a quaternary ion exchange site with one beta hydroxy group. When the quaternary ion exchange site is in the hydroxide form, hydroxide can react with the alcohol in the beta position (and to a lesser extent with alcohols more distant from the quaternary center) to produce a zwitterionic form that is reactive with epoxy compounds.

The first glycidol-derived reaction layer and subsequent layers can be applied to a substrate after a column is packed with the substrate, facilitating rapid screening of suitable chemistries and reaction cycle numbers. Furthermore, coatings can also be applied to the substrate under slurry conditions or in packed beds in order to provide suitable synthesis scale for large-scale production, minimizing manufacturing cost. The reaction process can be interrupted at any stage in the reaction process for testing without interfering with the process. The process can then be resumed based on intermediate test data. In various embodiments the glycidol-derived adduct coating is UV transparent making it suitable for direct detection of analytes within the stationary phase provided the material is applied to a suitable UV transparent substrate. These improvements come without sacrificing the benefits of batch synthesis Formation of a gel in a resin slurry mode or a flow-through "packed column" mode may be undesirable in that in the former case gelation would result in resin particles suspended in a stable gel unsuitable for use in liquid chromatography and in the latter case would result in the development of extremely high pressures, precluding the use of pumping as a means of delivering the reagent, rendering the material unsuitable for use in liquid chromatography. If instead, the ratio of the reagents is adjusted so that a gel does not form (preferably using a composition close to that capable of gelation without using a composition capable of gelation), the solution can be passed through the "packed column" without experiencing a high-pressure characteristic of gelation. Furthermore, the coating thickness will continue to increase as this solution is passed through the column.

Also, according to the invention, a large quantity of particles may be packed in a bed and coated in a large flow-through column and removed in large quantities as a supply for packed smaller analytical columns.

While in situ column preparation of condensation polymers is a convenient way of quickly evaluating different formulations, in-situ column preparation is generally not as efficient as batch synthesis. However, by making use of either slurry grafting techniques or preferably large packed bed reactors, optimal coating chemistries can easily be transferred to larger scale batch processes.

Methods of Chromatographic Analysis

Figure 2:
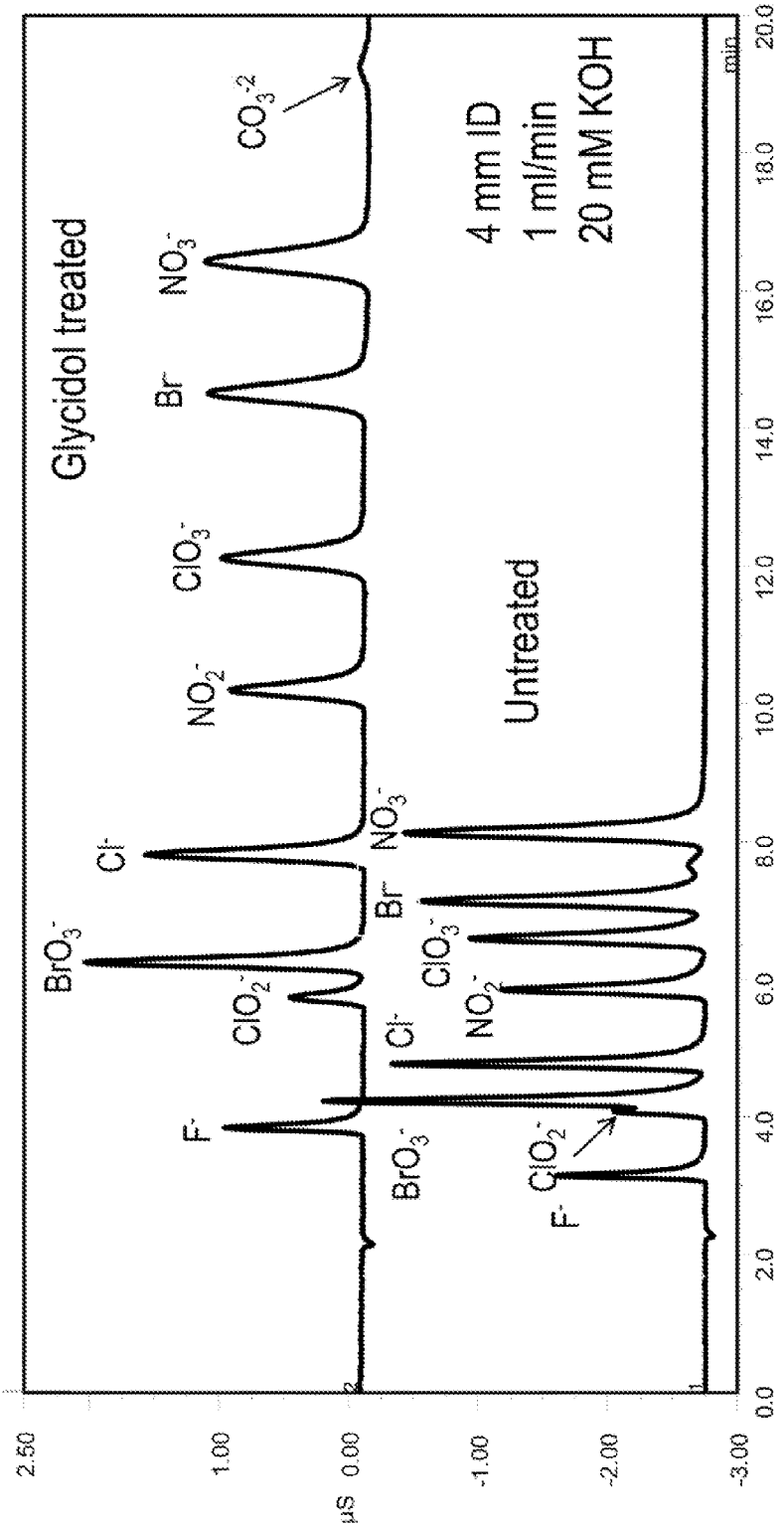
FIG. 2 shows the effect of glycidol treatment on the chromatographic properties of an exemplary solid support, AS20.

The present invention also provides methods of performing chromatographic separations using the stationary phases of the invention. An exemplary embodiment of this aspect of the invention is set forth in FIG. 2, which shows a chromatogram using an AS-20 modified according to a method of the invention. The AS20 column is based on the amine-diepoxide chemistry described in U.S. Pat. No. 7,291,395. It uses a wide-pore surface sulfonated substrate which is coated first with a 1 to 1 molar ratio of methylamine and butanediol diglycidol ether to produce a "ground layer" electrostatically attached to the surface. It is subsequently treated with three alternating cycles of first butanediol diglycidol ether and then methyl amine. Because the final reaction step involves an excess of primary amine, this outermost layer is not quaternized and contains mostly secondary amines. Treatment of this column with glycidol (shown in the upper chromatogram) converts the outermost amine groups to a quaternary form, roughly doubling the ion exchange capacity. The selectivity for monovalent species is largely unchanged. All columns described herein with the part number prefix "AS" are commercially available from Thermo Scientific Dionex (Sunnyvale, Calif., USA).

Figure 3:
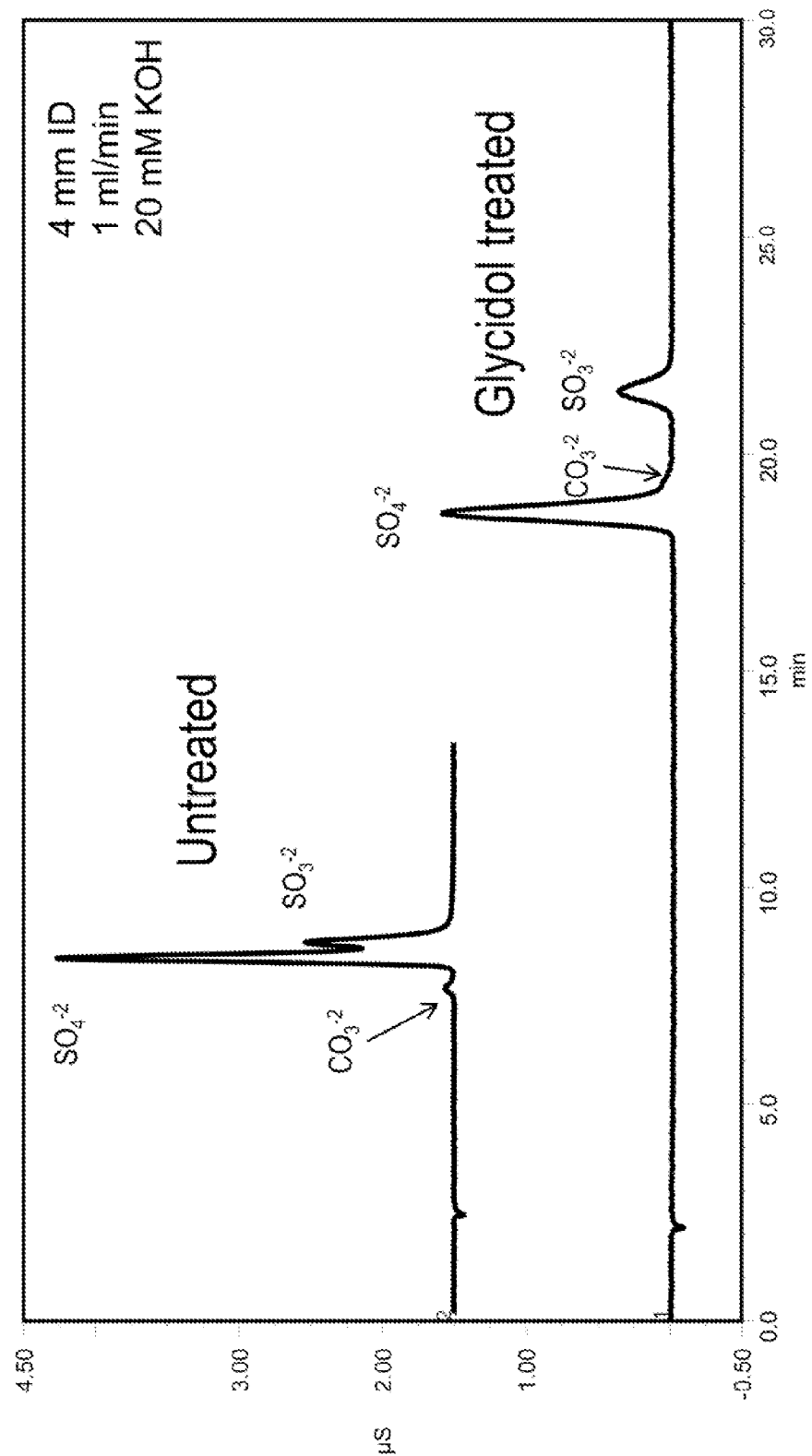
FIG. 3 shows the effect of glycidol treatment on the chromatographic properties of an exemplary solid support, AS20. The same AS20 column evaluated in FIG. 3 was also tested with carbonate, sulfate and sulfite. Glycidol treatment results in the unexpected and heretofore never reported selectivity for these species shown in the lower chromatogram. Unlike all other known anion exchange materials, this column exhibits coelution of carbonate and sulfate as well as excellent resolution of sulfate from sulfite with these two anionic species eluting in the opposite order normally observed with conventional anion exchange materials.

A further exemplary embodiment of the invention is illustrated in FIG. 3. The same AS20 column evaluated in FIG. 2 was also tested with carbonate, sulfate and sulfite. Glycidol treatment results in the unexpected and heretofore never reported selectivity for these species shown in the lower chromatogram. Unlike all other known anion exchange materials, this column exhibits coelution of carbonate and sulfate as well as excellent resolution of sulfate from sulfite with these two anionic species eluting in the opposite order normally observed with conventional anion exchange materials.

Figure 5:
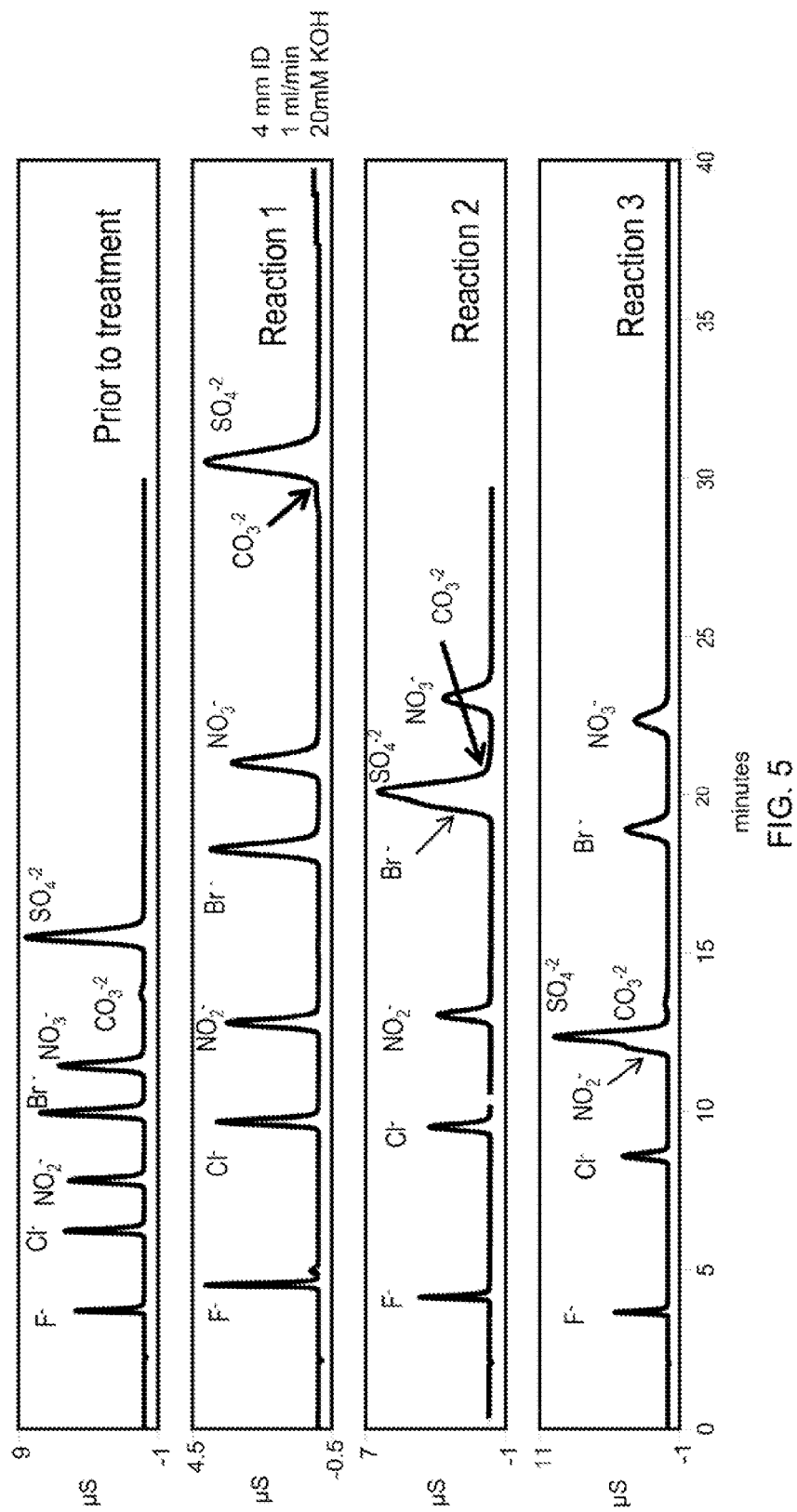
FIG. 5 shows the effect of glycidol treatment on the chromatographic properties of an exemplary solid support, AS19. A column of the solid support was treated successively with 20% glycidol in water at 60° C. through three reactions (Reactions 1-3).

An example of a chromatographic separation using a stationary phase of the invention is provided in FIG. 5, which illustrates the effect of successive glycidol treatments of the AS19 column. The AS19 column uses similar construction to that of the AS20 column except that instead of a final reaction step with methyl amine the final reaction step for the AS19 column is with methyldiethanol amine, which forms quaternary amines. Using this chemistry there are essentially no secondary or tertiary amines in the structure. Nonetheless, when the column was treated with glycidol while in the hydroxide form, significant changes in the capacity and selectivity are observed. The uppermost chromatogram illustrates the initial chromatography of the column prior to treatment. Afterward the column was treated with a 20% solution of glycidol in water at 60° C. for one hour. The column was then tested to produce the chromatogram labeled "Reaction 1". Notable after the first reaction is the substantial increase in retention time for all ions. This is due to a reduction in the number of beta hydroxy groups. It is believed that the beta hydroxy groups are primarily responsible for the enhanced elution power of hydroxide eluent with such phases. Since glycidol reacts with beta hydroxy groups, it reduces the elution power of hydroxide resulting in a net increase in retention. After testing, the column was again treated as above. After the second reaction the retention time of most monovalent species is largely unchanged, presumably because the majority of the beta hydroxy groups were consumed during the prior treatment. Divalent species exhibit an interesting shift as a consequence of a second reaction: a substantial reduction in retention. This is likely due to the fact that the second glycidol treatment results in reaction with other hydroxyl groups in the proximity of the quaternary center. The presence of additional reaction byproducts creates steric hindrance which may reduce the ability of divalent species to interact with 2 adjacent quaternary centers. In essence, glycidol is polymerizing with the alcohols in and around the quaternary center where the hydroxide held at the quaternary center is acting as a catalyst. Each reaction step increases the complexity of the structure producing a hyperbranched structure at each ion exchange site. The third reaction with glycidol produces a similar effect: essentially no change in retention time for monovalent species but additional reduction in the retention of divalent species. In addition, sulfate shifts forward more rapidly than carbonate and sulfite (not shown) again producing the very unusual selectivity noted in FIG. 3. This reaction sequence causes a modest increase in pressure (15% after three reaction cycles) and a modest decrease in efficiency (2% after three reaction cycles). The equation for chromatographic efficiency is:

$$N = \frac{5.55 t_R^2}{w_{1/2}^2}$$

where $t_R$ is the retention time and w is the peak width at half-height. Both of these changes in physical properties are consistent with the formation of one or more hyperbranched structures at each quaternary center.

Figure 6:
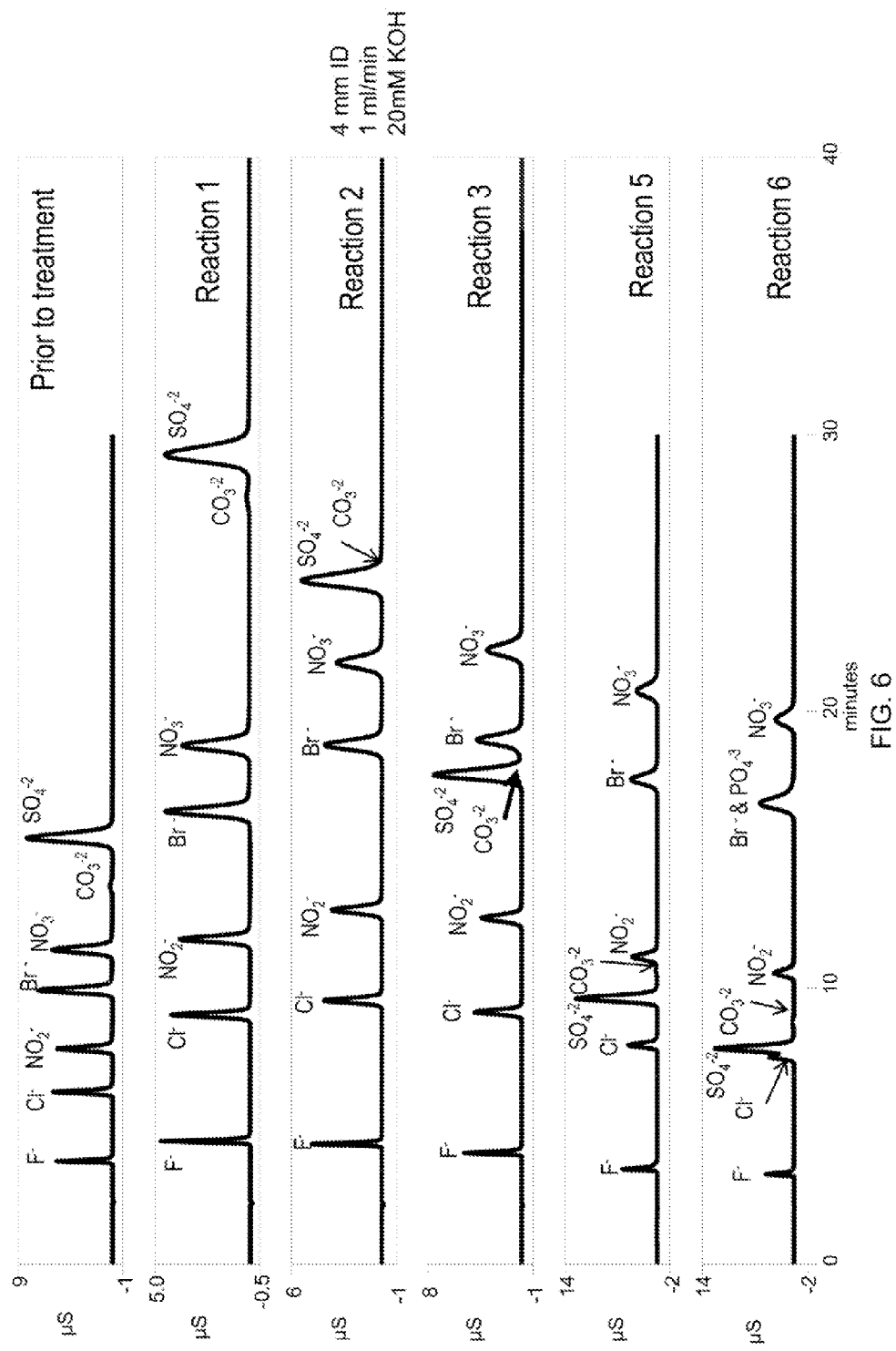
FIG. 6 shows the effects on the chromatographic properties of an exemplary solid support, AS19. A column of the solid support was treated successively with 10% glycidol in water at 60° C. through six reaction cycles (Reactions 1-6).

FIG. 6 provides another example of the use of a stationary phase in ion chromatography. FIG. 6 shows the repeated the experiment described in FIG. 5 with the exception that the concentration of glycidol was reduced to 10%. At this lower concentration, the effect of a single reaction with glycidol is less dramatic but the trends are exactly the same as with 20% glycidol. Under these conditions it takes two reaction cycles to maximize the retention time for monovalent species while divalent species reach maximum retention after only one reaction cycle. From the third cycle on, each subsequent reaction cycle results in very small decreases in retention for monovalent species while divalent species show a much more pronounced shift to lower retention starting from the second cycle.

Figure 7:
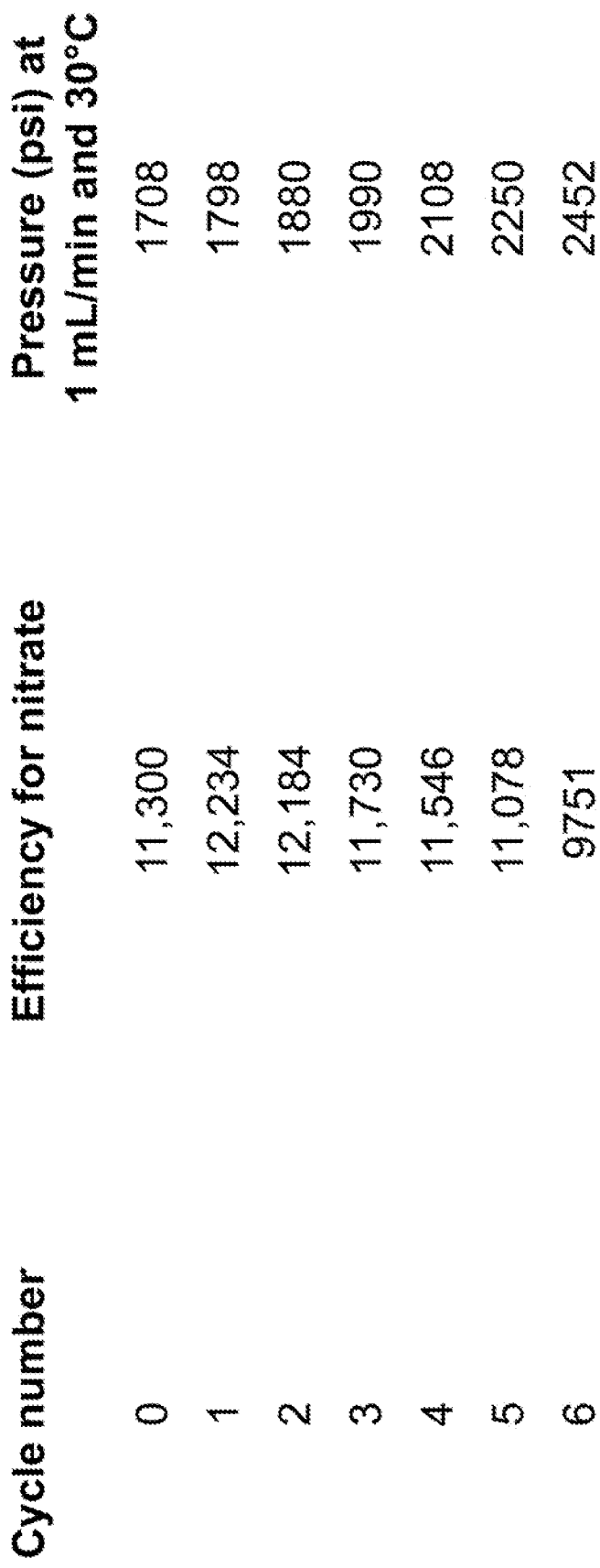
FIG. 7 shows the effect of glycidol treatment on the chromatographic properties and backpressure of an exemplary solid support, AS19, which was treated successively through 6 reaction cycles with 10% glycidol in water at 60° C.

In FIG. 7, the influence of glycidol reaction cycles on both efficiency and pressure for nitrate is shown in tabular form. Similar trends are observed for other ions, nitrate was chosen as representative. From this it's clear that the influence of reaction cycles on efficiency is quite different from the influences of the reaction cycles on pressure. Efficiency actually increases after the first reaction cycle and doesn't drop below the initial efficiency until the fifth reaction cycle. Pressure, on the other hand, increases with each reaction cycle and the magnitude of this increase also expands with each reaction cycle. Presumably this is because the hyperbranched polyglycerol structure formed from each reactive center in the original hyperbranched structure is progressively expanding with each reaction cycle increasing the phase volume and hence operating pressure as it obstructs flow-through passageways between beads and to a lesser extent flow through pores in the beads. In the initial reaction cycles this increase in polymer size does not influence efficiency because analytes are not impeded as they diffuse past these polymer structures to the ion exchange sites. However, as the hyperbranched structure becomes ever more expansive it appears that after five or six reaction cycles that mass transport of analyte through this hyperbranched structure becomes at least partially retarded. Accordingly, it's important to control the extent of hyperbranching so as to avoid excessive hyperbranching and associated decreases in chromatographic performance. Glycidol concentration, reaction temperature, the number of reaction cycles, reaction time and reaction pH can all be used to control the extent of hyperbranched structure formation. Increases in glycidol concentration, reaction temperature, the number of reaction cycles and reaction time have the effect of increasing hyperbranching while increases in reaction pH tend to reduce the extent of hyperbranching.

Figure 8:
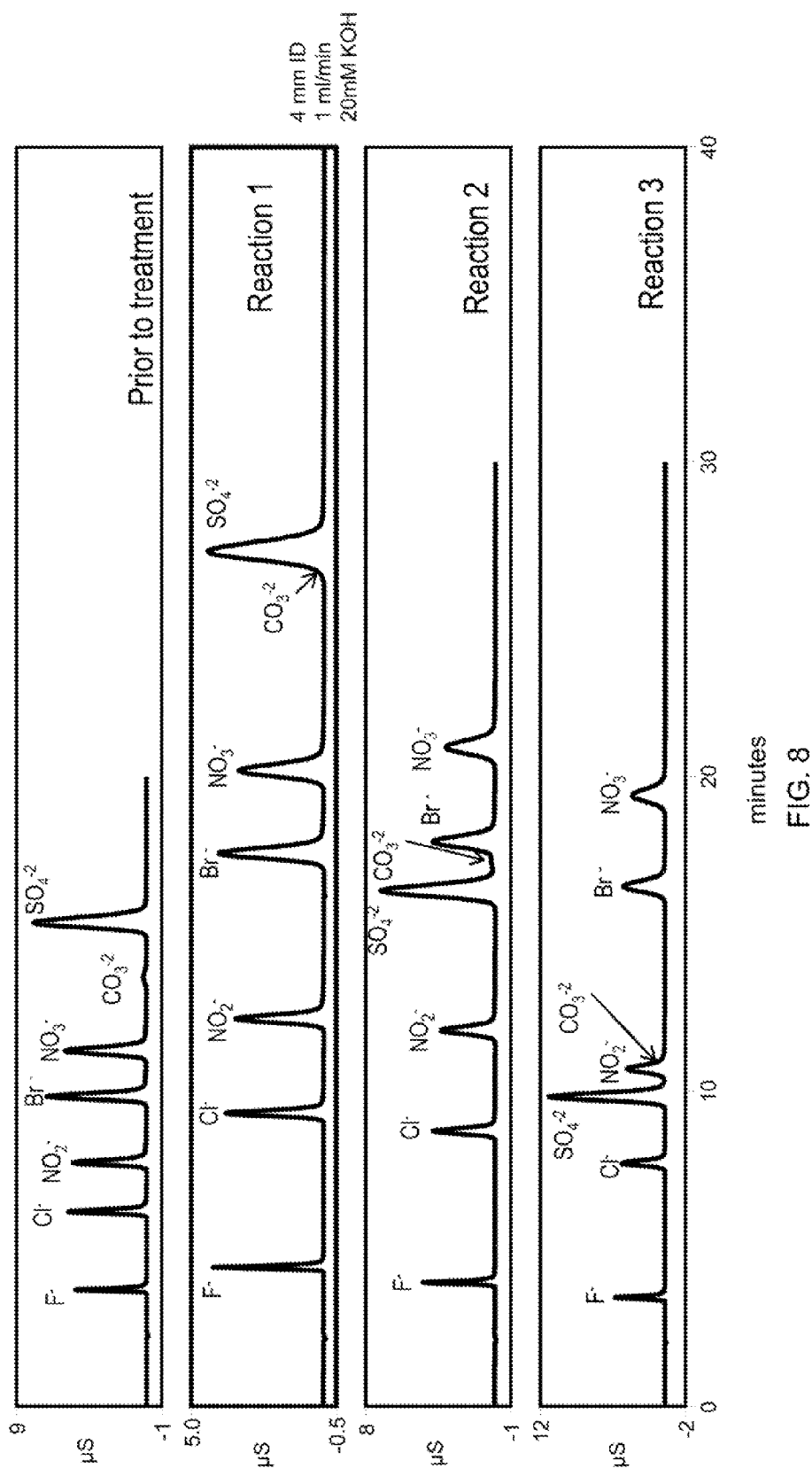
FIG. 8 shows the effect of glycidol treatment on the chromatographic properties of an exemplary solid support, AS19, treated with 10% glycidol in water at 70° C. through three reaction cycles (Reactions 1-3).

The chromatogram in FIG. 8 was measured on an AS19 column treated with 10% glycidol in water at 70° C. This figure illustrates the use of elevated temperature as an alternative to use of higher glycidol concentrations to increase the efficiency of modification of reactive sites. In this experiment, a 10% glycidol solution in water was used as a reaction medium but the reaction temperature was increased to 70° C. The selectivity modifications observed after three reaction cycles are roughly equivalent to what was observed in FIG. 5 using 20% glycidol at 60° C. In this case, a similar pattern was observed with respect to the changes in nitrate efficiency and column pressure with efficiency first increasing and then gradually decreasing while pressure progressively increases. The magnitude of these net changes is somewhat larger at 70° C. than was observed using 20% glycidol at 60° C. In this case, nitrate efficiency decreased 9.4% while pressure increased 32.7% suggesting that overall higher molecular weight polymers are produced by using lower concentrations of glycidol at higher temperatures.

Figure 9:
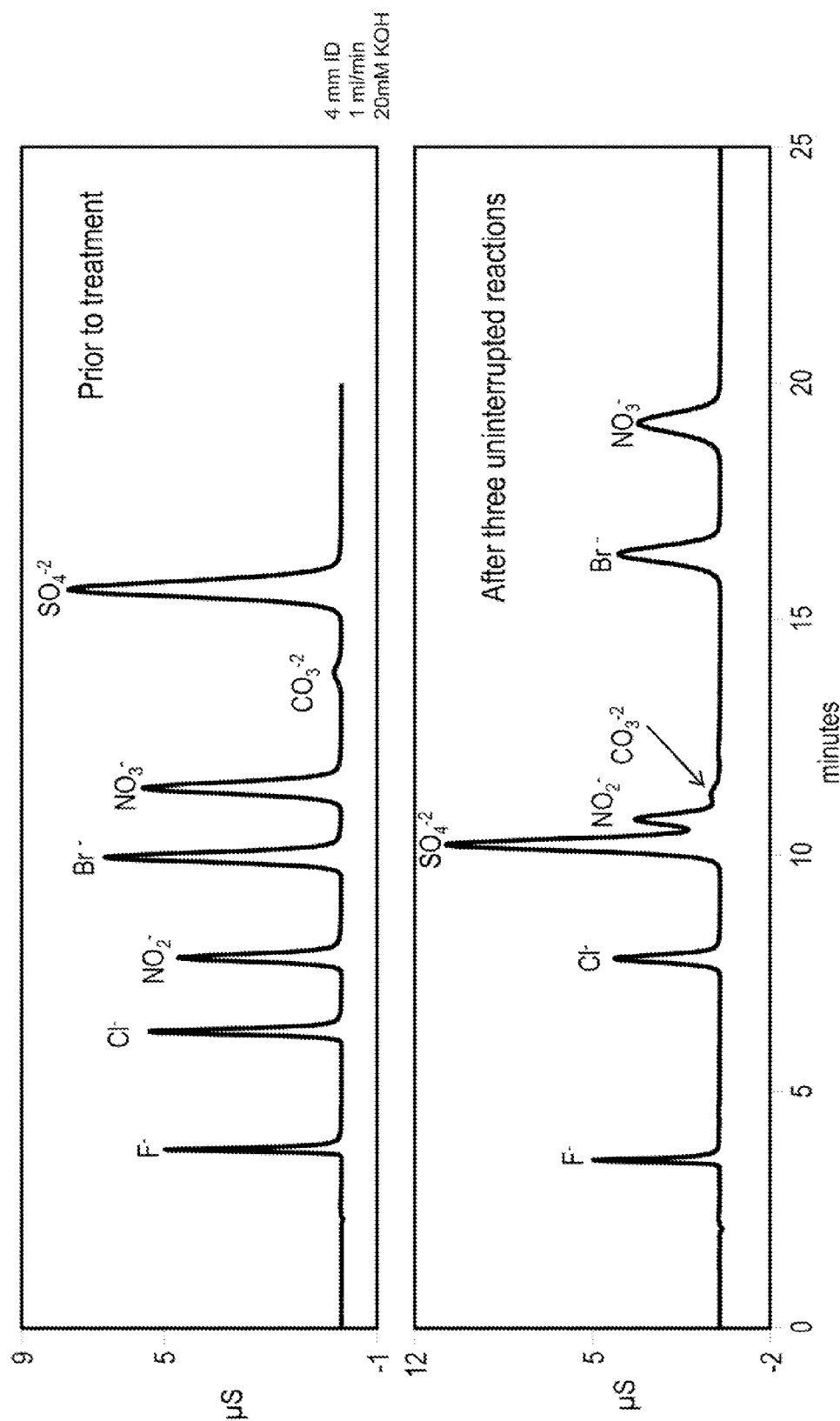
FIG. 9 shows the effect of glycidol treatment on the chromatographic properties of an exemplary solid support, AS19, in its basic form, treated with 10% glycidol in water at 70° C. after three successive reaction cycles (Reactions 1-3).

FIG. 9 shows a chromatogram, using an AS19 column treated with 10% glycidol in water at 70° C., which illustrates the ability to prepare comparable materials using an uninterrupted synthesis method. The results were quite comparable to those shown in FIG. 8 after three reaction cycles. Clearly, equivalent results can be achieved without interrupting the manufacturing process to evaluate the progress of the reaction in cases where multiple reaction cycles are of commercial interest.

Figure 10:
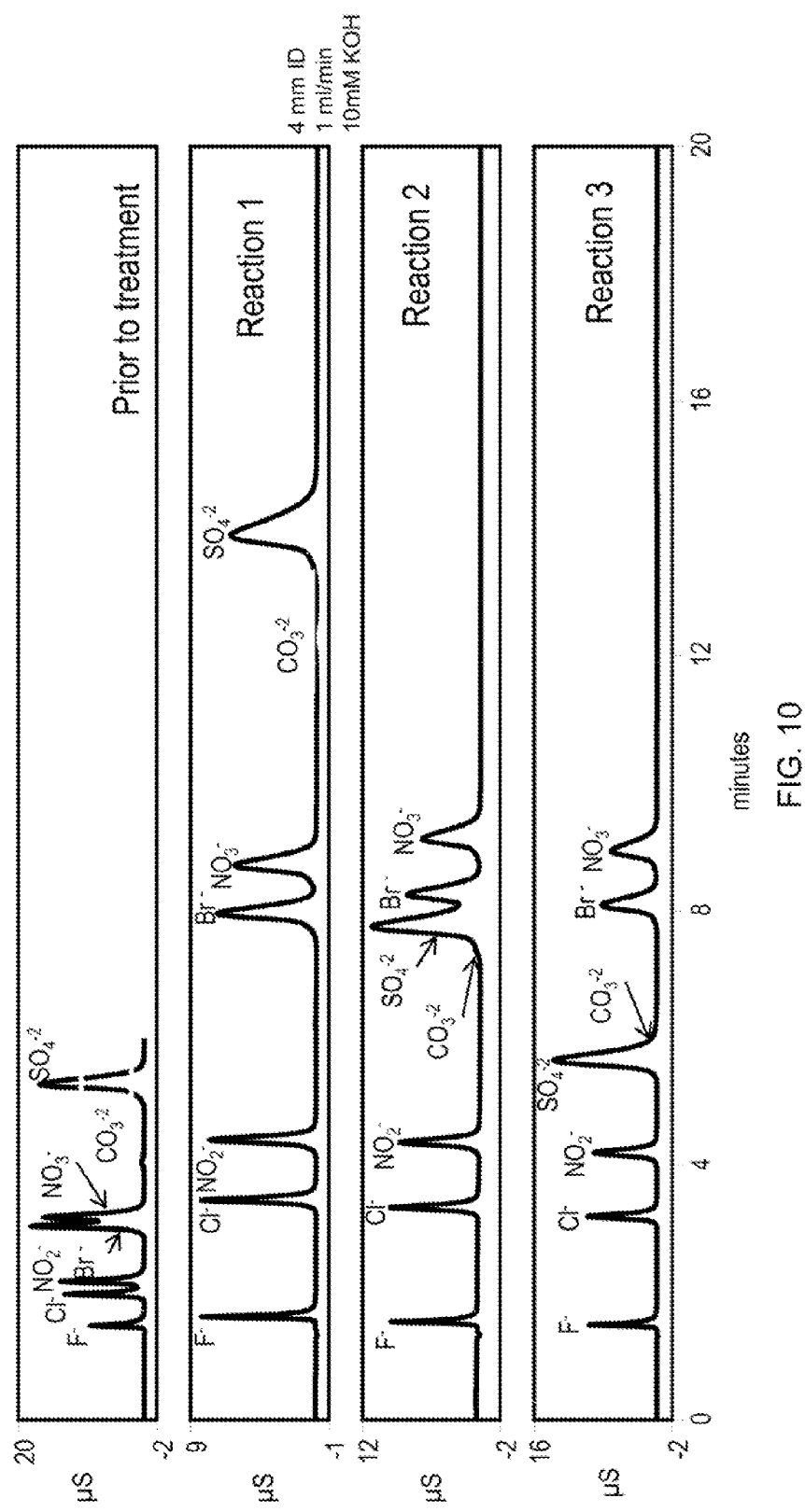
FIG. 10 shows the effect of glycidol treatment on the chromatographic properties of an exemplary solid support, AS11, treated with 20% glycidol in water at 60° C. through three successive reaction cycles (Reactions 1-3).

The previous figures illustrated the versatility of glycidol for modifying hyperbranched structures but the same chemistries are useful for modifying other types of anion exchange materials. FIG. 10 shows a similar series of reactions involving glycidol with a stationary phase derived from vinylbenzylglycidyl ether cross-linked with divinylbenzene and functionalized with methyldiethanol amine. In this case, the anion exchange phase was prepared via emulsion polymerization and then reacted with methyldiethanol amine to prepare anion exchange nanoparticles. Highly cross-linked divinylbenzene-ethylvinylbenzene copolymer beads were surface sulfonated and then brought in contact with anion exchange nanoparticles to prepare the column. The nanoparticles are electrostatically attached to the surface of the copolymer beads in the manner similar to the attachment method used for the hyperbranched condensation polymers shown earlier. Quite different behavior is seen upon treatment with glycidol. While the general effect is a substantial increase in retention upon initial treatment with glycidol in reaction one along with a progressive decrease in retention for divalent species upon subsequent reaction cycles, effect upon monovalent selectivity is substantially different. Prior to the first treatment with glycidol the column can only partially resolve bromide from nitrate. After glycidol treatment, bromide-nitrate resolution is substantially enhanced. Using conventional techniques, bromide-nitrate resolution can be modified by increasing the cross-link but this has the undesirable side effect of reducing the chromatographic performance for more highly retained monovalent species. Glycidol improves bromide-nitrate resolution without this undesired side effect.

Figure 11:
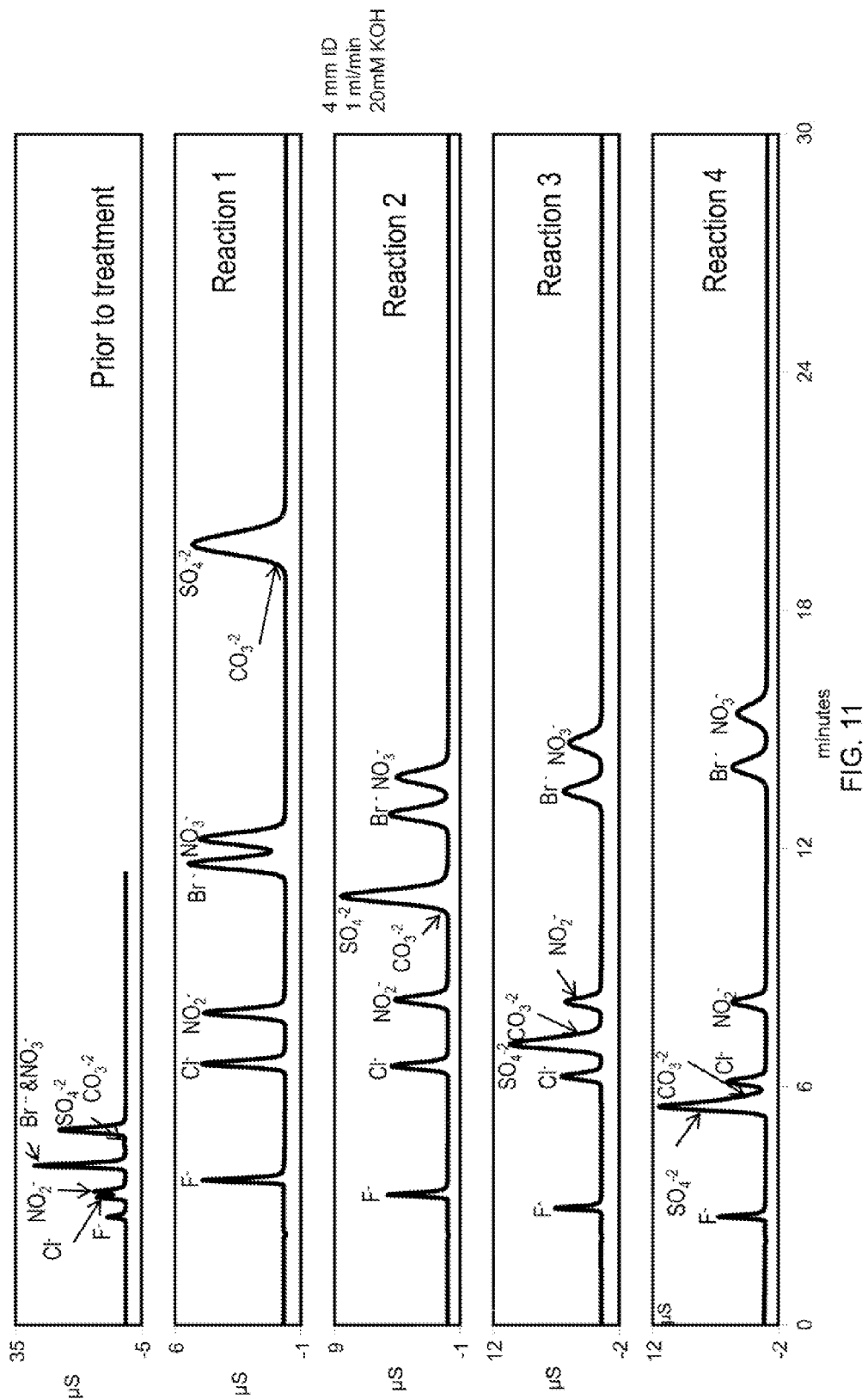
FIG. 11 shows the effect of glycidol treatment on the chromatographic properties of an exemplary solid support, AS16, treated with 10% glycidol in water at 70° C. through four successive reaction cycles (Reaction 1-4).

FIG. 11 illustrates the utility of glycidol for modifying selectivity of another phase constructed in a similar somewhat manner to that utilized to generate the chromatogram in FIG. 10. Here the monomer and amine are the same as in FIG. 10 although the cross-link of the nanoparticles is substantially reduced to improve the chromatographic performance of highly retained monovalent species such as perchlorate. However, in this case the nanoparticles are attached to substrate panicles which are highly porous with average pore size of 2000 Å. After sulfonation of the substrate, the nanoparticles coat not only the exterior surface but also the interior surface of the particles to produce a uniform thin-film over the entire surface of the particle. Because a reduced cross-link was used in the preparation of these particles, bromide and nitrate completely coelute and even chloride and nitrite are only partially resolved. After a single reaction cycle with 10% glycidol at 70° C., rather profound changes in the ion exchange selectivity are observed in addition to the general trend of increased retention for all analytes. Chloride and nitrite resolution are dramatically improved after one reaction cycle. In addition, bromide and nitrate are nearly baseline resolved. Subsequent reaction cycles produce progressive improvements in the bromide-nitrate resolution along with small increases in retention. Again, glycidol provides a means of improved resolution for early eluting hydrophilic ions without degrading the performance of highly retained polarizable ions such as perchlorate.

Figure 12:
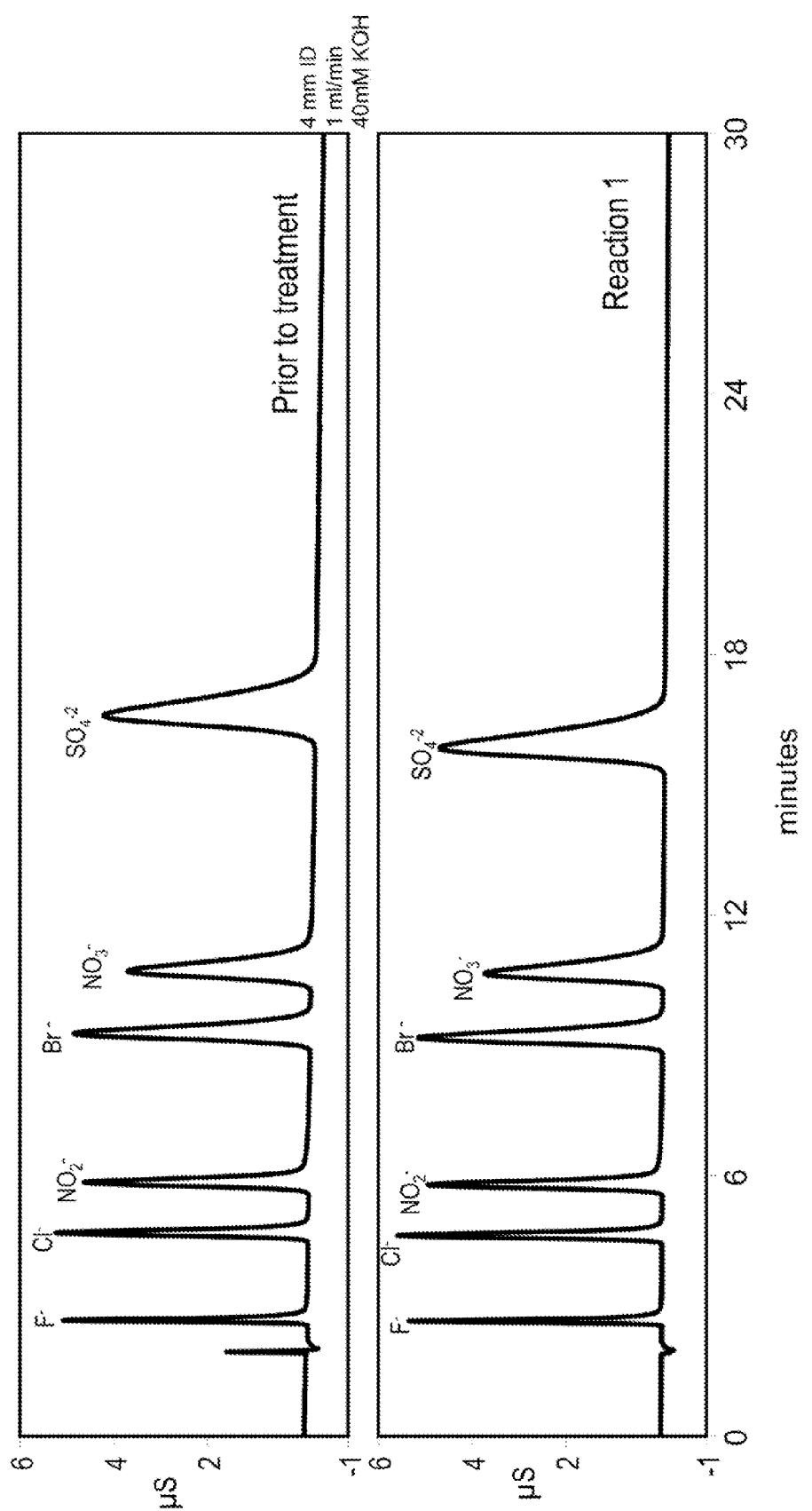
FIG. 12 shows the effect of glycidol treatment on the chromatographic properties of an exemplary solid support, AS12A, treated with 10% glycidol in water at 70° C. This solid support has a surface of vinylbenzyl chloride-divinylbenzene copolymer which has been quaternized with triethylamine and does not covalently react with glycidol.

FIG. 12 illustrates the benefit from hydroxy groups in the proximity of the quaternary ion exchange site in order to observe glycidol enhancement of selectivity. In this case, the column chosen is constructed in a similar fashion to the column described in FIG. 11 with the exception that the nanoparticles coating the surface are composed of a vinylbenzyl chloride-divinylbenzene copolymer which has been quaternized with triethylamine. Because the structure surrounding the quaternary center contains no hydroxyl groups, there are no reactions sites for glycidol. As the lower chromatogram illustrates, there is essentially no change in the chromatography after one reaction with glycidol. This confirms the requirement for a hydroxyl moiety near the quaternary center in order to observe the influence of glycidol on ion exchange retention and selectivity.

Glycidol functionalization is also of use in stationary phases in which the solid support is formed by radical grafting. The chromatogram in FIG. 13 was generated using a high cross-link divinylbenzene-ethylvinylbenzene copolymer bead with average pore size of 100 Å and 450 $m^2$ per gram surface area. The surface has been modified by grafting with a quaternized monomer prepared from the reaction of vinylbenzyl chloride with methyldiethanol amine using radical polymerization. The resulting grafted substrate contains numerous short strands of cationic polymer covalently attached to the surface and projecting away from the surface due to electrostatic repulsion from adjacent strands. Again the general trend is the same: the first glycidol treatment results in a significant increase in retention with subsequent reaction cycles resulting in dramatic retention decreases for divalent species along with minimal retention decreases for monovalent species. For the common monovalent anions shown in this figure, the selectivity appears to be relatively unaffected by glycidol treatment. Obviously, such a material could be produced by first reacting glycidol with the monomer and then grafting the monomer already derivatized with glycidol to the surface of the resin. The advantage of grafting and then reacting with glycidol is that multiple reactions with glycidol can easily be performed without the need for elaborate purification steps between each glycidol treatment step as would be required when the reaction is done in solution. Here, multiple reaction steps are as simple as rinsing the column with hydroxide to make sure that the phase is in the correct form and passing a solution of glycidol through the column and then allowing it to react.

Multiple treatments with glycidol can be accomplished by simply repeating this process as often as required.

Figure 13:
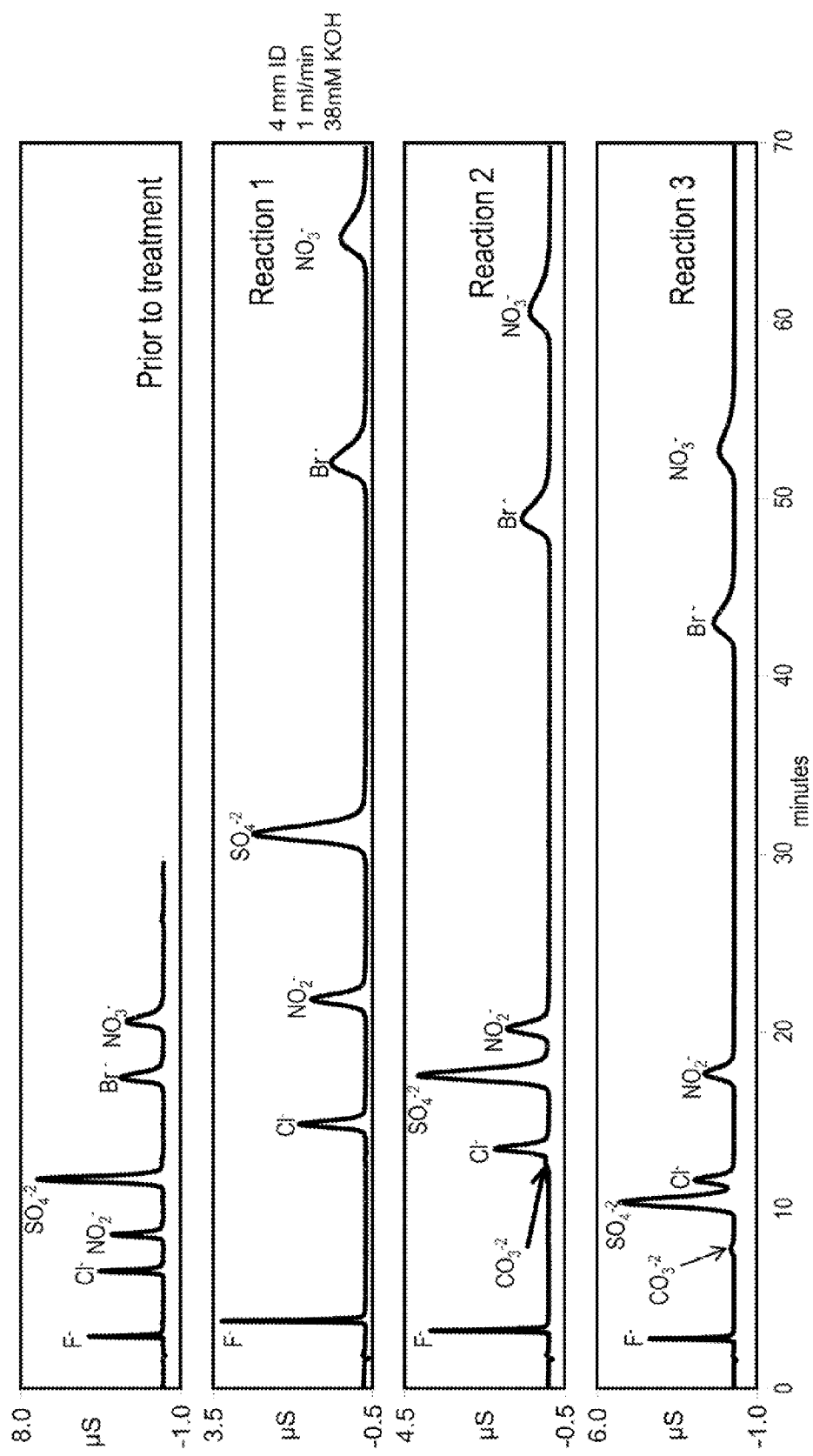
FIG. 13 shows the effect of glycidol treatment on the chromatographic properties of an exemplary solid support, AS15, treated with 10% glycidol in water at 70° C. through three reaction cycles (Reaction 1-3).
Figure 14:
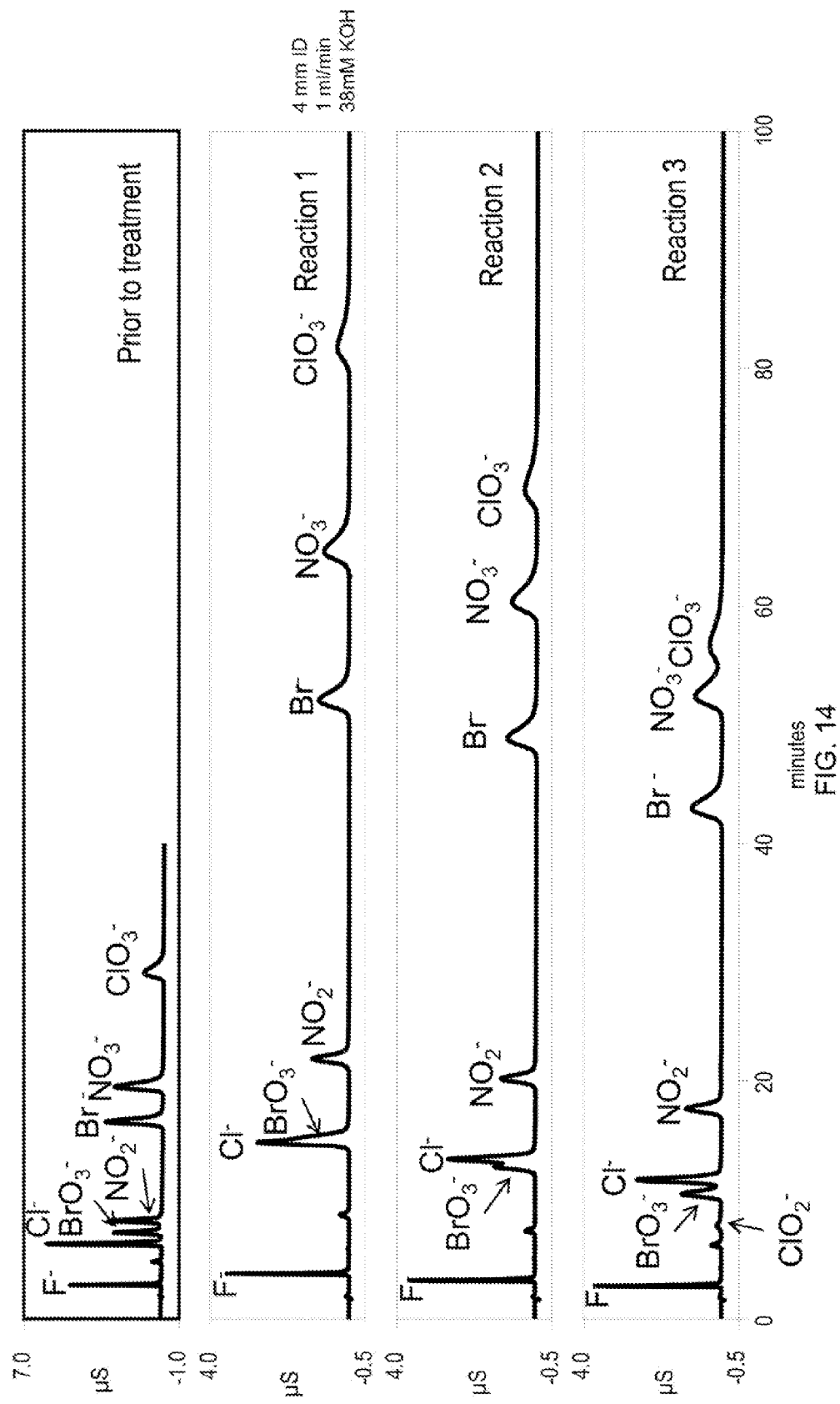
FIG. 14 shows the effect of glycidol treatment on the chromatographic properties of an exemplary solid support, AS15, treated with 10% glycidol in water at 70° C. through three successive reaction cycles (Reactions 1-3).

FIG. 14 is a chromatogram generated with the same column as that used to generate the chromatogram shown in FIG. 13 with a more diverse set of monovalent species. Substantial selectivity changes are observed for some of the less common monovalent anions of interest in drinking water analysis. Chlorate, for example, elutes well after nitrate on the column before treatment with glycidol while the gap between nitrate and bromide is much smaller. After the first reaction with glycidol, the spacing between bromide and nitrate has increased much more rapidly than the spacing between nitrate and chlorate. Subsequent treatments with glycidol result in small reductions in the retention of bromide and nitrate but much more significant reduction in the retention of chlorate. Clearly, glycidol can be used to optimize the selectivity for these three ions. Similarly, the retention of bromate relative to chloride is also strongly influenced by the reaction of glycidol. Before treatment with glycidol, bromate elutes after chloride but after three reaction cycles bromate is nearly baseline resolved ahead of chloride providing selectivity previously unknown when using styrenic monomers.

Figure 15:
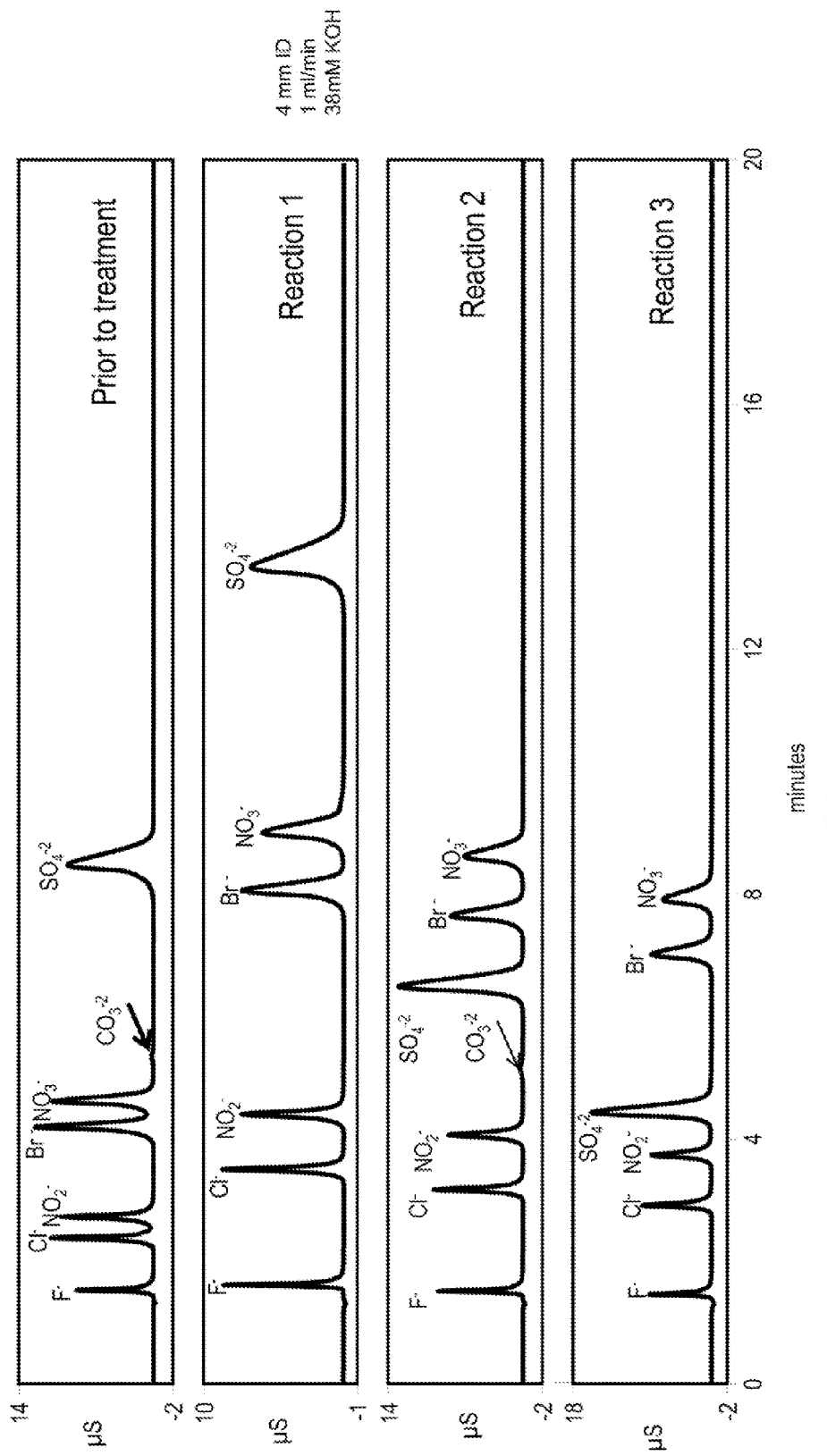
FIG. 15 shows the effect of glycidol treatment on the chromatographic properties of an exemplary solid support, AS17C, treated with 10% glycidol in water at 70° C. through three successive reaction cycles (Reactions 1-3).

FIG. 15 is a chromatogram illustrating the effect of glycidol on the selectivity of another anion exchange column utilizing construction similar to what was reported for FIG. 10. In this case, the nanoparticle stationary phase is based on a vinylbenzyl chloride-divinylbenzene copolymer functionalized with methyldiethanol amine. Highly crosslinked divinylbenzene-ethylvinylbenzene copolymer nonporous beads were surface sulfonated and then brought in contact with the above anion exchange nanoparticles to prepare the column. The nanoparticles are electrostatically attached to the exterior of the copolymer beads. The chromatogram exhibits a familiar trend: an initial increase in retention for all ions after the first glycidol treatment, minimal shift in retention time for monovalent species after the first glycidol treatment but substantial reduction in the retention time for divalent and higher valence species (not shown) after the first glycidol treatment. Here glycidol treatment enhances the resolution of chloride and nitrite as well as bromide and nitrate.

Figure 16:
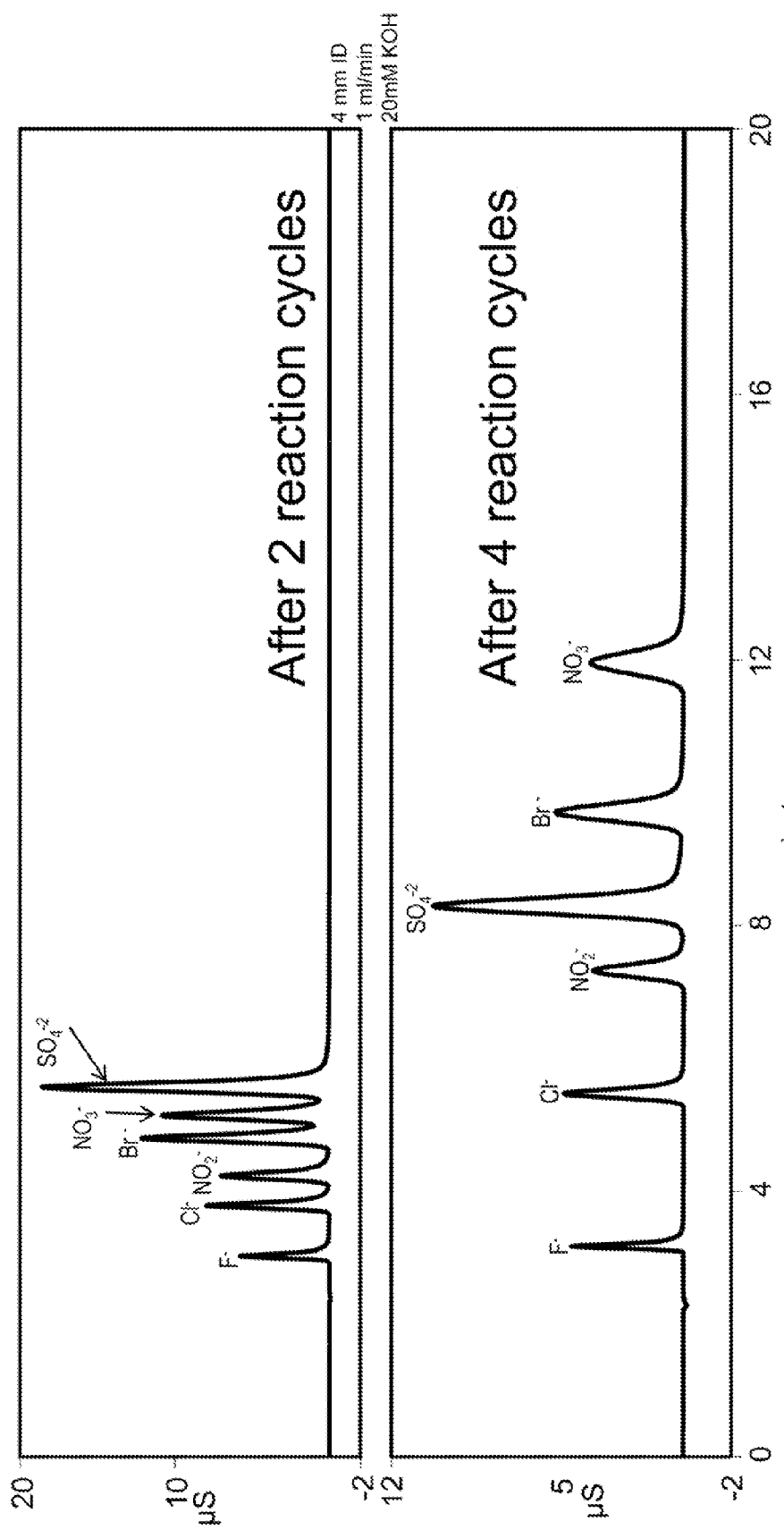
FIG. 16 shows the effect of repeated polymerization steps on the chromatographic properties of an exemplary solid support based on N-methylglucamine condensation synthesis.

The chromatogram in FIG. 16 was generated using a new phase designed to minimize retention of polyvalent species through maximal steric hindrance. The stationary phase was constructed in a manner similar to what was shown in FIG. 2-9 using conditions described in U.S. Pat. No. 7,291,395. Here, the initial ground layer is a copolymer of methyl amine and butanedioldiglycidol ether while the remainder of the hyperbranched polymer is constructed by reacting this initial ground layer first with butanedioldiglycidyl ether and second with N-methylglucamine in alternating fashion. The upper chromatogram shows the column after two such reaction cycles while the lower chromatogram shows the same column after a total of four such reaction cycles have been completed. Because of the steric hindrance due to the bulky glucamine sidechain, sulfate retention is reduced relative to monovalent species such that both bromide and nitrate elute after sulfate when using 20 mM potassium hydroxide eluent. The effect of glycidol hyperbranching is to reduce through steric hindrance the ability of multivalent species to interact simultaneously with multiple anion exchange sites. Therefore, the combination of glycidol with this already sterically hindered hyperbranched polymer should exaggerate the effect well beyond what has been seen thus far.

Figure 17:
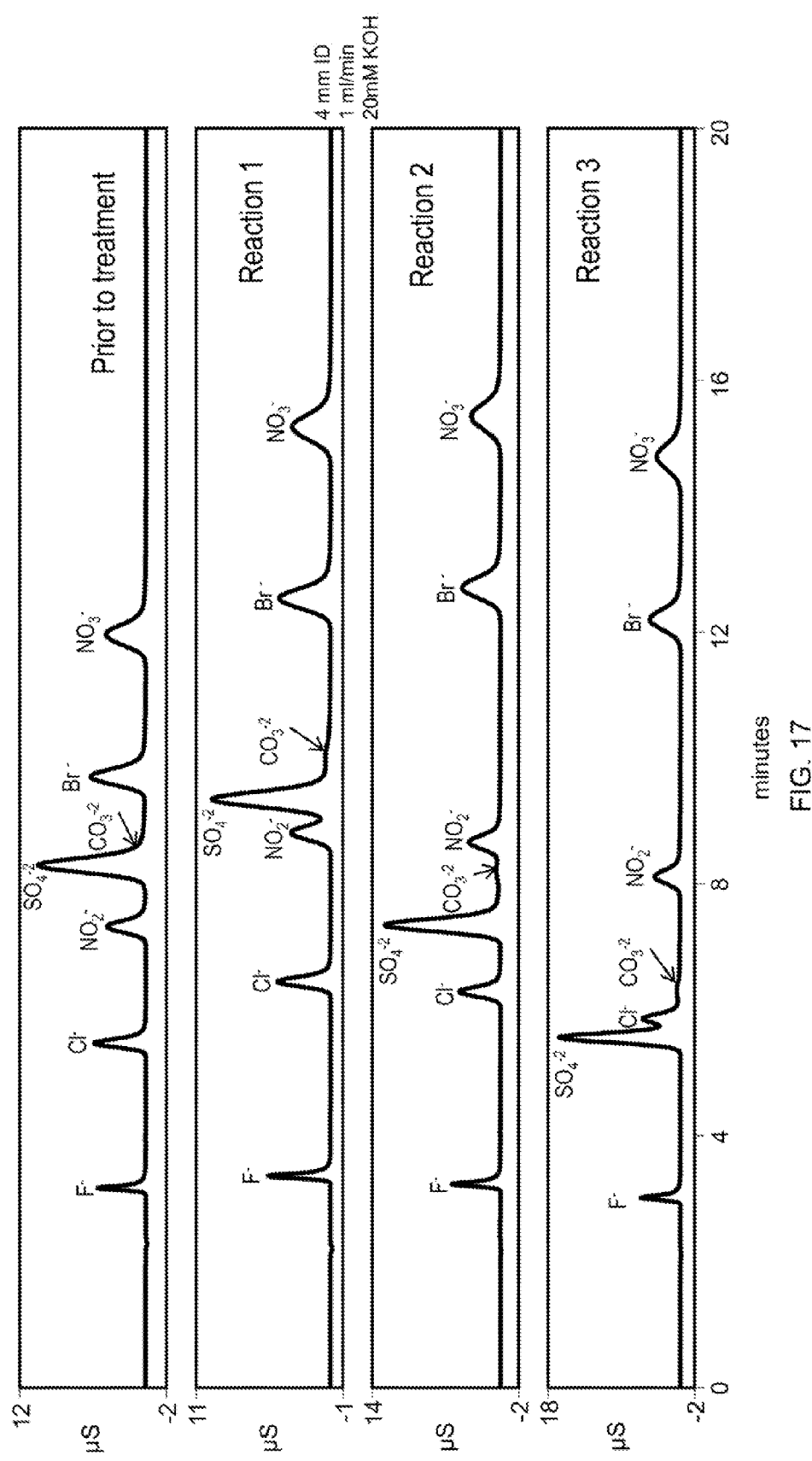
FIG. 17 shows the effect of glycidol treatment on the chromatographic properties of the exemplary solid support of FIG. 16 after three reaction cycles (Reaction 1-3).

FIG. 17 is a chromatogram illustrating the influence of glycidol on the selectivity of a sterically hindered hyperbranched structure. As expected, glycidol had a profound effect on sulfate retention. However, the trend is somewhat different from what was seen in earlier examples. Normally, the selectivity with regard to monovalent and divalent species does not significantly change after the first glycidol treatment but shifts after all subsequent treatments. In this case, even after the first glycidol treatment sulfate shifted position relative to nitrite. Monovalent species have shifted significantly later as has been seen with all previous examples but here sulfate retention shifted only slightly later. As a result, the nitrite-sulfate resolution has dropped significantly after the first glycidol treatment. After three glycidol reaction cycles sulfate elutes before chloride even though the eluent concentration is only 20 mM. This clearly indicates that the combined effect of glycidol with sterically hindered hyperbranched structures further reduces the retention of polyvalent species. While it is true that selectivity for a given monovalent-divalent pair can be adjusted by changing the eluent concentration, prior art anion exchange phases required much higher eluent concentrations to achieve this selectivity. Since use of low eluent concentrations minimizes the cost of eluents, reduces waste disposal costs and reduces background signal associated with eluent impurities, it is advantageous to be able to achieve such selectivity using lower eluent concentrations.

Figure 18:
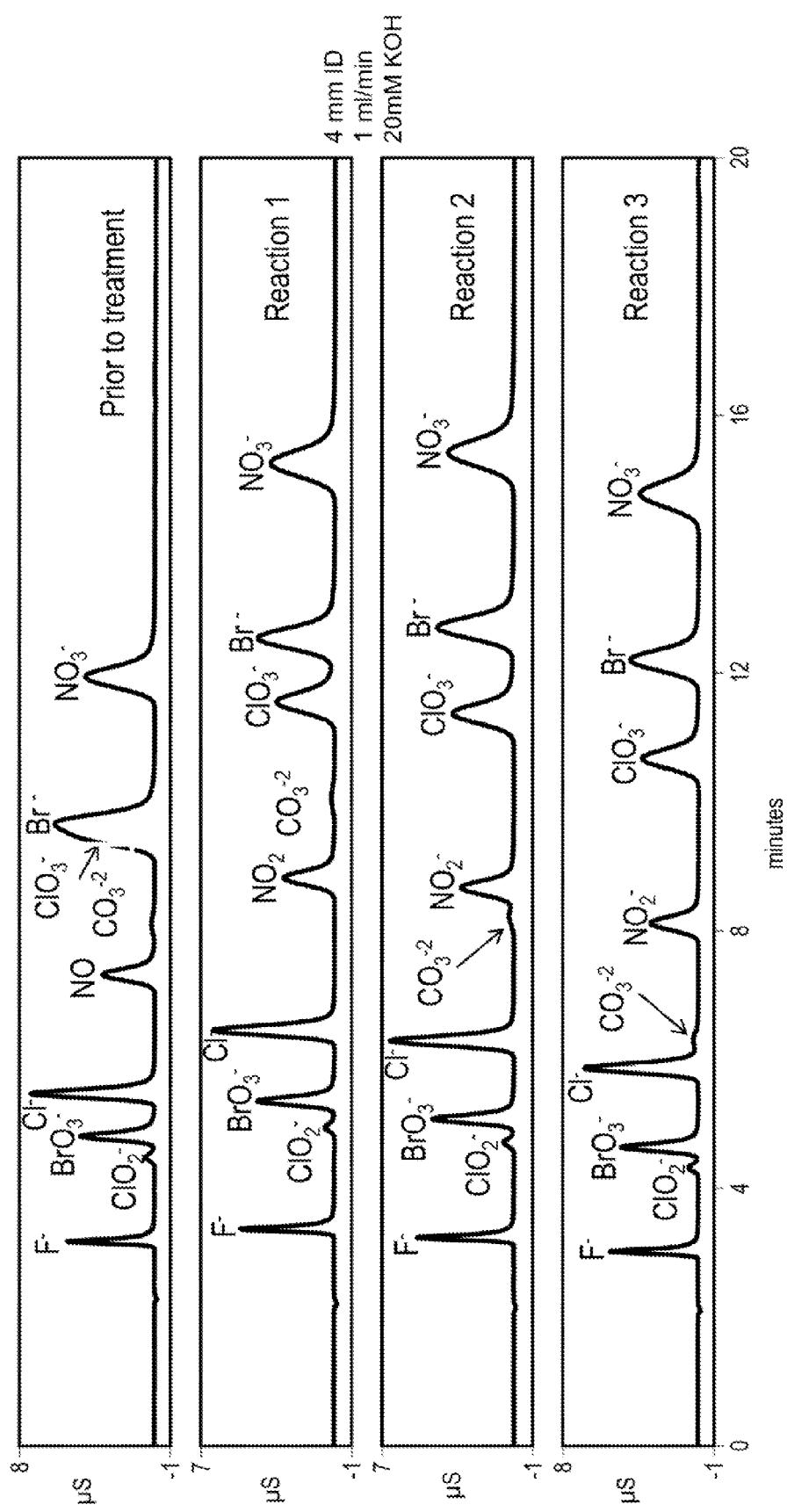
FIG. 18. Prototype N-methylglucamine column after glycidol treatment. This figure examines the effect of glycidol reaction with the same sterically hindered phase described in FIG. 17 after three reaction cycles (Reactions 1-3).

The effect of steric hindrance can be seen in the chromatogram of FIG. 18. This figure provides a chromatogram informative as to the effect of glycidol reaction with the same sterically hindered phase described in FIG. 17. Glycidol treatment significantly modifies the selectivity of the phase. In particular, prior to glycidol treatment bromide and chlorate essentially co-elute. After one glycidol treatment the bromide and chlorate are nearly baseline resolved. Subsequent reactions with glycidol further improve the bromide-chlorate resolution. Similar trends are observed for bromate-chloride where resolution is modest prior to glycidol treatment that significantly enhanced with glycidol treatment. Because real samples normally contain high concentrations of chloride and very low concentrations of bromate, it is important to have good resolution of these two species in order to quantitate bromate at trace levels. Glycidol treatment significantly improves the ability to quantitate bromate in drinking water as a consequence of this improved resolution.

Figure 19:
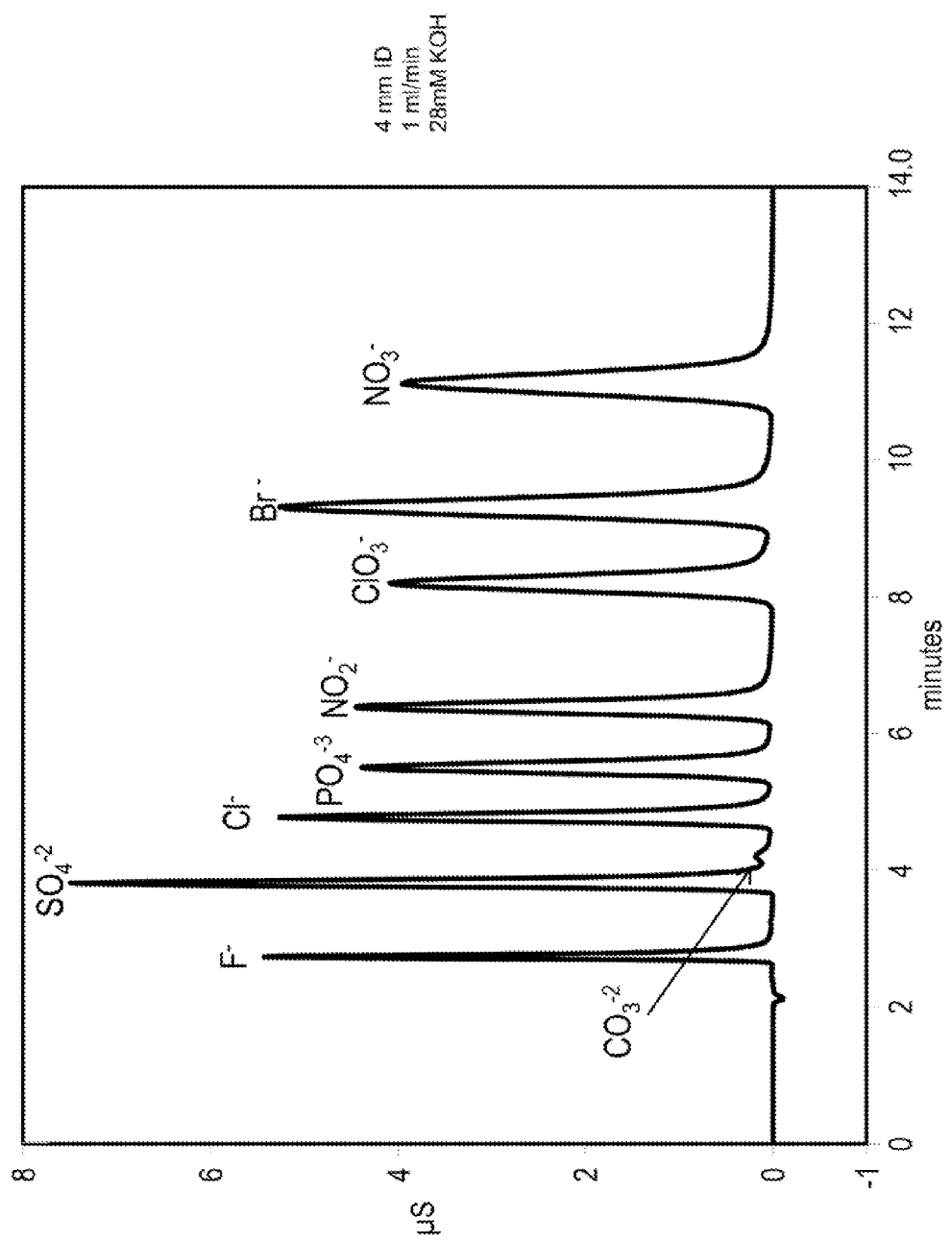
FIG. 19 shows the effect of glycidol treatment on the chromatographic properties of an exemplary solid support according to FIG. 17 and FIG. 18. This figure illustrates an optimized eluent system with the column shown in FIG. 17 and FIG. 18.
Figure 20:
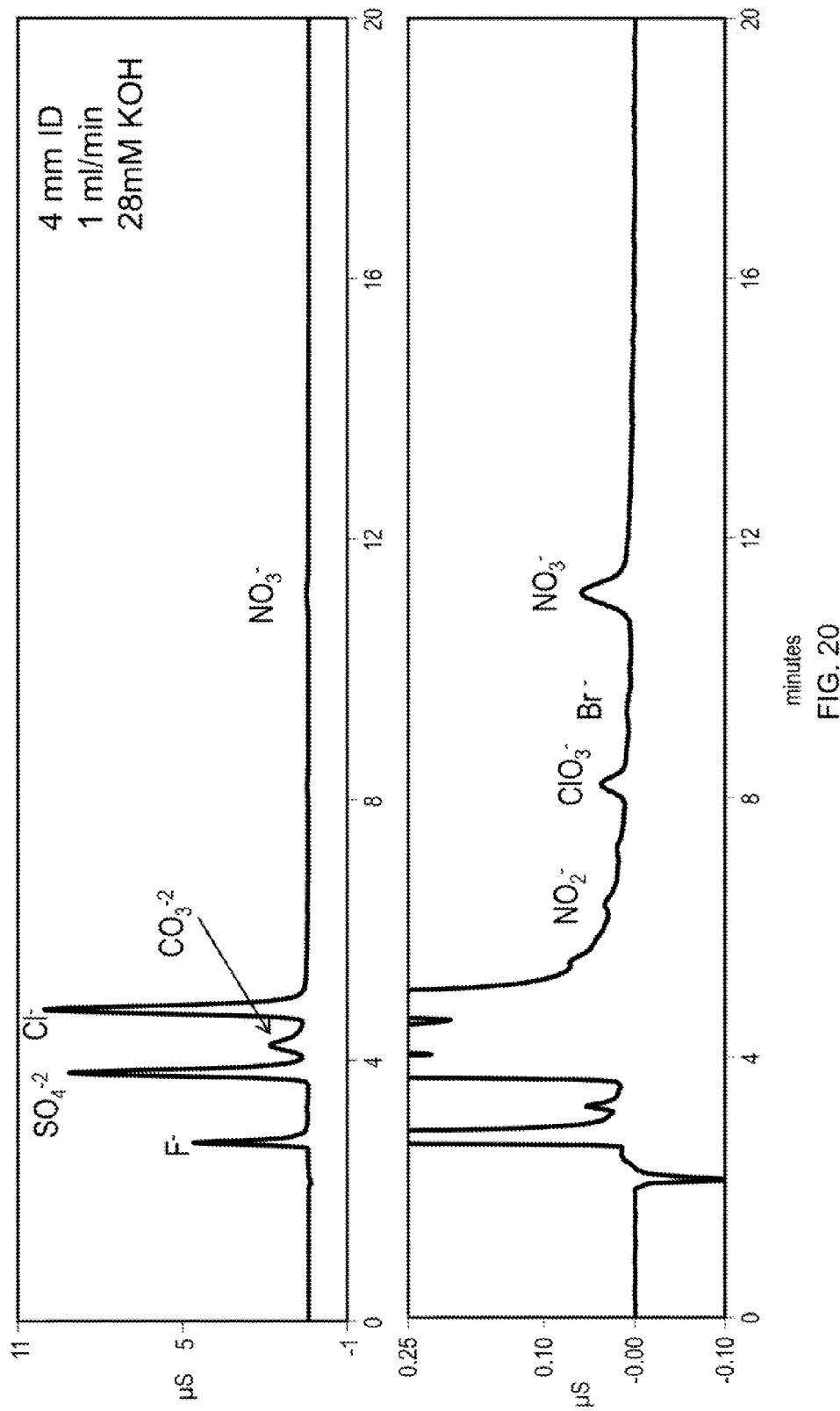
FIG. 20 is a chromatogram taken with the column described in FIG. 17-19 with a real drinking water sample.
Figure 21:
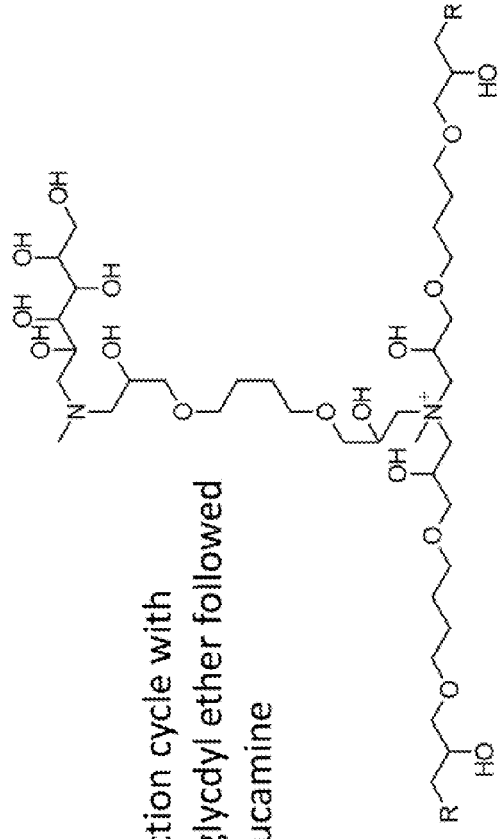
FIG. 21 shows an exemplary diglycidyl-derivatized N-methylglucamine stationary phase of the invention.
Figure 21:
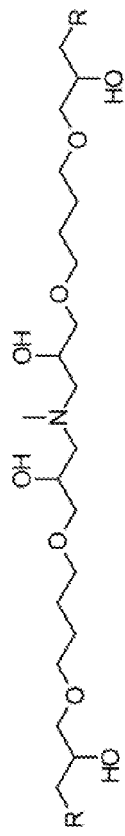

A chromatogram from a prototype N-methylglucamine column after 3× glycidol treatment is shown in FIG. 19. This figure illustrates an optimized eluent system with the column shown in FIG. 17 and FIG. 18. The advantage of the selectivity of this phase for common anions using a relatively low 28 mM concentration of hydroxide is apparent. The most ubiquitous ions in drinking water are chloride, sulfate and carbonate. Using this eluent system, these three ions elute together as a group well away from ions commonly present at trace levels, significantly improving analytical utility.

EXAMPLES

Example 1

The column was converted to the hydroxide form by passing 20 mM KOH over the column at 1 mL/min for 10 minutes. The column was then filled with a 20% glycidol solution at 0.5 mL per minute for 10 min while submersed in a 60° C. water bath. The column was then left stagnant for an additional 60 min to allow glycidol to react with the column. At the end of this synthesis cycle the column was rinsed with deionized water for 30 min and then placed in an instrument for evaluation. This cycle was repeated as indicated in the figures. See, FIGS. 2, 3, 5 and 10.

Example 2

An AS19 column was converted to the hydroxide form by passing 20 mM KOH over the column at 1 mL/min for 10 minutes. The column was then filled with a 10% glycidol solution at 0.5 mL per minute for 10 min while submersed in a 60° C. water bath. The column was then left stagnant for an additional 60 min to allow glycidol to react with the column. At the end of this synthesis cycle the column was rinsed with deionized water for 30 min and then placed in an instrument for evaluation. This cycle was repeated two more times. See, FIG. 6.

Example 3

An AS19 column was converted to the hydroxide form by passing 20 mM KOH over the column at 1 mL/min for 10 minutes. The column was then filled with a 10% glycidol solution at 0.5 mL per minute for 10 min while submersed in a 70° C. water bath. The column was then left stagnant for an additional 60 min to allow glycidol to react with the column. At the end of this synthesis cycle the column was rinsed with deionized water for 30 min and then placed in an instrument for evaluation. This cycle was repeated as indicated in FIG. 8.

Example 4

The column was converted to the hydroxide form by passing 20 mM KOH over the column at 1 mL/min for 10 minutes. The column was then filled with a 10% glycidol solution at 0.5 mL per minute for 10 min while submersed in a 70° C. water bath. The column was then left stagnant for an additional 60 min to allow glycidol to react with the column. At the end of this synthesis cycle the column was rinsed with deionized water for 30 min and then placed in an instrument for evaluation. This cycle was repeated as indicated in FIGS. 11, 12, 13, 14 and 15.

Example 5

An AS19 column was converted to the hydroxide form by passing 20 mM KOH over the column at 1 mL/min for 10 minutes. The column was then rinsed with deionized water for 5 min and then filled with a 10% glycidol solution at 0.5 mL per minute for 10 min while submersed in a 70° C. water bath. The column was then left stagnant for an additional 60 min to allow glycidol to react with the column. The column was then rinsed with deionized water for 5 min at 0.5 mL per minute, rinsed with 0.1 molar sodium hydroxide for 10 min at 0.5 mL per minute, rinsed with deionized water for 5 min at 0.5 mL per minute and then filled with a 10% glycidol solution at 0.5 mL per minute for 10 min, all while still submerged in a 70° C. water bath. The column was again allowed to remain stagnant for an additional 60 min to allow for a second glycidol reaction to take place in the column. The column was again rinsed with deionized water for 5 min at 0.5 mL per minute, rinsed with 0.1 molar sodium hydroxide for 10 min at 0.5 mL per minute, rinsed with deionized water for 5 min at 0.5 mL per minute and then filled with a 10% glycidol solution at 0.5 mL per minute for 10 min, all while still submerged in a 70° C. water bath. The column was again allowed to remain stagnant for an additional 60 min to allow for a third glycidol reaction to take place in the column. At the end of this synthesis cycle the column was rinsed with deionized water for 30 min and then placed in an instrument for evaluation. See, FIG. 9

Example 6

An AS19 column was converted to the hydroxide form by passing 20 mM KOH over the column at 1 mL/min for 10 minutes. The column was then filled with a 10% glycidol solution containing 10 mM sodium hydroxide at 0.5 mL per minute for 10 min while submersed in a 70° C. water bath. The column was then left stagnant for an additional 60 min to allow glycidol to react with the column. At the end of this synthesis cycle the column was rinsed with deionized water for 30 min and then placed in an instrument for evaluation. This cycle was repeated two additional times. The results were similar to Example 3 shown in FIG. 8. The increase in pressure after three cycles was less than in Example 3 but the reduction in retention sulfate was also less than in Example 3, indicating that increased reaction pH reduces hyperbranching but also reduces reaction efficiency.

Example 7

An AS19 column was converted to the hydroxide form by passing 20 mM KOH over the column at 1 mL/min for 10 minutes. The column was then filled with a 10% glycidol solution at 0.5 mL per minute for 10 min while submersed in a 70° C. water bath. The column was then left stagnant for an additional 200 min to allow glycidol to react with the column. At the end of this synthesis cycle the column was rinsed with deionized water for 30 min and then placed in an instrument for evaluation. Although the total reaction time with glycidol was identical to Example 3 (shown in FIG. 8) the results were significantly different. The selectivity observed was quite similar to the one reaction cycle of Example 3 rather than matching the selectivity after three reaction cycles even though the time of glycidol reaction was identical to the three independent reaction cycles of Example 3. The increase in pressure was less than in Example 3 after three reaction cycles but the reduction in retention sulfate was also less than an Example 3, indicating that multiple independent reactions with glycidol is much more efficient than a one step reaction with glycidol of similar duration.

Example 8

5.08 grams of surface sulfonated wide pore resin with an average pore size of approximately 2000 Å was added to 15 grams of deionized water, filtered and then washed with deionized water, 50 mL of methanol, 100 mL deionized water and finally 20 mL of resin slurry solution. The filter cake was transferred to a 125 mL vacuum flask, 8.00 g of resin slurry solution added and the mixture was vacuum sonicated for 2 minutes. The slurry mixture was packed at flow rate of 8 mL per minute for 30 minutes. The column was removed from the packer, frits and end fittings were installed, the column was submerged in a 70° C. water bath and connected to the reagent delivery pump. A reaction mixture consisting of 7.2% butanediol diglycidyl ether and 1.12% methyl amine was pumped through the column at 0.5 mL per minute for 10 min. The column was then left stagnant for an additional 60 min to allow the mixture to react and become electrostatically attached to the resin. The column was then rinsed with deionized water for 5 min at 0.5 mL per minute and then filled with a 10% butanediol diglycidyl ether solution at 0.5 mL per minute for 10 min, all while still submerged in a 70° C. water bath. The column was again allowed to remain stagnant for an additional 20 min to allow for epoxide coupling reaction to take place in the column. The column was again rinsed with deionized water for 5 min at 0.5 ml, per minute and then filled with a 0.5 molar N-methylglucamine solution at 0.5 mL per minute for 10 min, all while still submerged in a 70° C. water bath. The column was again allowed to remain stagnant for an additional 20 min to allow for the N-methylglucamine reaction to take place in the column. The column was then rinsed with deionized water for 5 min at 0.5 mL per minute and then filled with a 10% butanediol diglycidyl ether solution at 0.5 mL per minute for 10 min, all while still submerged in a 70° C. water bath. The column was again allowed to remain stagnant for an additional 20 min to allow for epoxide coupling reaction to take place in the column. The column was again rinsed with deionized water for 5 min at 0.5 mL per minute and then filled with a 0.5 molar N-methylglucamine solution at 0.5 mL per minute for 10 min, all while still submerged in a 70° C. water bath. The column was again allowed to remain stagnant for an additional 20 min to allow for the N-methylglucamine reaction to take place in the column. The column was then rinsed with deionized water for 30 min and then removed from the water bath for testing.

After testing the column was reconnected to the reagent pump, rinsed with deionized water for 5 min at 0.5 mL per minute and then filled with a 10% butanediol diglycidyl ether solution at 0.5 mL per minute for 10 min, all while still submerged in a 70° C. water bath. The column was again allowed to remain stagnant for an additional 20 min to allow for epoxide coupling reaction to take place in the column. The column was again rinsed with deionized water for 5 min at 0.5 mL per minute and then filled with a 0.5 molar N-methylglucamine solution at 0.5 mL per minute for 10 min, all while still submerged in a 70° C. water bath. The column was again allowed to remain stagnant for an additional 20 min to allow for the N-methylglucamine reaction to take place in the column. The column was then rinsed with deionized water for 5 min at 0.5 mL per minute and then filled with a 10% butanediol diglycidyl ether solution at 0.5 mL per minute for 10 min, all while still submerged in a 70° C. water bath. The column was again allowed to remain stagnant for an additional 20 min to allow for epoxide coupling reaction to take place in the column. The column was again rinsed with deionized water for 5 min at 0.5 mL per minute and then filled with a 0.5 molar N-methylglucamine solution at 0.5 mL per minute for 10 min, all while still submerged in a 70° C. water bath. The column was again allowed to remain stagnant for an additional 20 min to allow for the N-methylglucamine reaction to take place in the column. The column was then rinsed with deionized water for 30 min and then removed from the water bath for testing.

The column was converted to the hydroxide form by passing 20 mM KOH over the column at 1 mL/min for 10 minutes. The column was then filled with a 10% glycidol solution at 0.5 mL per minute for 10 min while submersed in a 70° C. water bath. The column was then left stagnant for an additional 60 min to allow glycidol to react with the column. At the end of this synthesis cycle the column was rinsed with deionized water for 30 min and then placed in an instrument for evaluation. This cycle was repeated two additional times. See, FIG. 17-20.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

All publications, patents, and patent applications cited herein are hereby incorporated by reference in their entirety for all purposes.

What is claimed is:

1. An anion exchange chromatographic medium comprising a solid support having attached thereto an anion exchange moiety comprising a glycidol-derived ether having the formula:

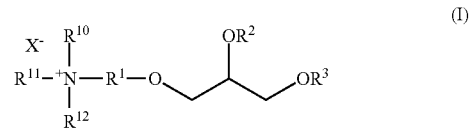

wherein
  $R^1$ is selected from substituted or unsubstituted alkyl and substituted or unsubstituted heteroalkyl;
  $R^2$ and $R^3$ are selected from H, substituted or unsubstituted alkyl and substituted or unsubstituted heteroalkyl;
  $R^{10}$, $R^{11}$ and $R^{12}$ are members independently selected from H, substituted or unsubstituted alkyl, substituted or unsubstituted heteroalkyl, substituted or unsubstituted aryl, substituted or unsubstituted heteroaryl and substituted or unsubstituted heterocycloaryl, wherein at least one member selected from $R^{10}$, $R^{11}$ and $R^{12}$ is or comprises a covalent bond to said solid support; and
  $X^-$ is an organic or inorganic anion.

2. The anion exchange chromatographic medium according to claim 1, wherein $R^2$ and $R^3$ are independently selected from H and

wherein $R^4$ and $R^5$ are independently selected from H, substituted or unsubstituted alkyl and substituted or unsubstituted heteroalkyl.

3. The anion exchange chromatographic medium according to claim 2, wherein $R^4$ and $R^5$ are independently selected from H and

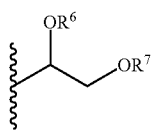

(III)

wherein $R^6$ and $R^7$ are independently selected from H, substituted or unsubstituted alkyl and substituted or unsubstituted heteroalkyl.

4. The anion exchange chromatographic medium according to claim 3, wherein $R^6$ and $R^7$ are independently selected from H and

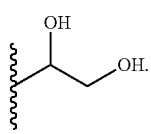

(IV)

5. The anion exchange chromatographic medium according to claim 1, wherein $R^1$ is:

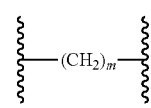

(V)

wherein
m is 2, 3, 4, 5 or 6.

6. The anion exchange chromatographic medium according to claim 1, wherein said support comprises a polymerized synthetic organic polymer.

7. The anion exchange chromatographic medium according to claim 6, wherein said solid support is a resin.

8. An anion exchange chromatographic medium comprising a solid support having attached thereto an anion exchange moiety comprising a glycidol-derived ether having the formula:

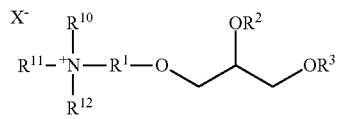

(I)

wherein
$R^1$ is selected from substituted or unsubstituted alkyl and substituted or unsubstituted heteroalkyl,
$R^2$ and $R^3$ are selected from H, substituted or unsubstituted alkyl and substituted or unsubstituted heteroalkyl,
$R^{10}$, $R^{11}$ and $R^{12}$ are members independently selected from H, substituted or unsubstituted alkyl, substituted or unsubstituted heteroalkyl, substituted or unsubstituted aryl, substituted or unsubstituted heteroaryl and substituted or unsubstituted heterocylcoaryl, and
$X^-$ is an organic or inorganic anion, and
wherein at least one of $R^{10}$, $R^{11}$ and $R^{12}$ comprises a moiety according to Formula VI:

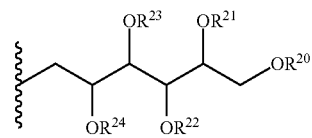

(VI)

wherein $R^{20}$, $R^{21}$, $R^{22}$, $R^{23}$ and $R^{24}$ are independently selected from H and a glycidol-derived ether, with the proviso that at least one of $R^{20}$, $R^{21}$, $R^{22}$, $R^{23}$ and $R^{24}$ is said glycidol-derived ether.

9. The anion exchange chromatographic medium according to claim 1, wherein said solid support is a product of condensation polymerization.

10. The anion exchange chromatographic medium according to claim 9, wherein said condensation polymerization is between an amine and a diepoxide.

11. The anion exchange chromatographic medium according to claim 1 in a flow-through bed suitable for use as a chromatographic device.

12. A chromatography column packed with the anion exchange chromatographic medium according to claim 1.

13. A chromatographic method comprising flowing a liquid through a bed of separation medium comprising the composition of claim 1.

14. The chromatographic method of claim 13, wherein said liquid comprises anions, cations and uncharged molecules.

15. A method of separating analytes in a liquid sample comprising flowing said liquid sample through an anion exchange chromatographic medium comprising a solid support having attached thereto an anion exchange moiety comprising a glycidol-derived ether having the formula:

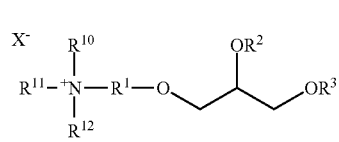

(I)

wherein
$R^1$ is selected from substituted or unsubstituted alkyl and substituted or unsubstituted heteroalkyl,
$R^2$ and $R^3$ are selected from H, substituted or unsubstituted alkyl and substituted or unsubstituted heteroalkyl,
$R^{10}$, $R^{11}$ and $R^{12}$ are members independently selected from H, substituted or unsubstituted alkyl, substituted or unsubstituted heteroalkyl, substituted or unsubstituted aryl, substituted or unsubstituted heteroaryl and substituted or unsubstituted heterocylcoaryl, and
$X^-$ is an organic or inorganic anion,
wherein said sample includes both carbonate and sulfate and sulfate elutes before carbonate during said separating.

16. A chromatographic system comprising the flow through bed of claim 11 in fluidic communication with one or more of:
a) a suppressor;
b) an injection valve;
c) a source of eluent; and
d) a detector.

17. The chromatographic system according to claim 16, wherein said flow through bed is a column.

* * * * *